US006488333B2

(12) United States Patent
Kim

(10) Patent No.: US 6,488,333 B2
(45) Date of Patent: Dec. 3, 2002

(54) VEHICLE SEAT FOR REVERSIBLE OCCUPANT TRAVEL

(76) Inventor: Hoon Y. Kim, 2400 West Fullerton, Chicago, IL (US) 60647

( * ) Notice: Subject to any disclaimer, the term of this patent is extended or adjusted under 35 U.S.C. 154(b) by 0 days.

(21) Appl. No.: 09/812,728

(22) Filed: Mar. 19, 2001

(65) Prior Publication Data

US 2002/0024245 A1 Feb. 28, 2002

Related U.S. Application Data

(63) Continuation-in-part of application No. 09/480,407, filed on Jan. 11, 2000, which is a continuation-in-part of application No. 09/368,193, filed on Aug. 4, 1999, now Pat. No. 6,199,945.
(60) Provisional application No. 60/210,552, filed on Jun. 9, 2000.

(51) Int. Cl.[7] ................................................. B60N 2/32
(52) U.S. Cl. ........................... 297/94; 297/95; 297/233; 297/234; 297/236; 297/237; 297/238; 297/256.16; 297/114; 297/383; 296/65.1; 296/64
(58) Field of Search ........................... 297/94, 130, 237, 297/238, 233, 234, 235, 114, 3, 1, 2; 296/64, 65.1

(56) References Cited

U.S. PATENT DOCUMENTS

| | | | | |
|---|---|---|---|---|
| 601,727 | A | * | 4/1898 | Campbell ................... 297/234 |
| 645,609 | A | | 3/1900 | Schellenbach ................ 297/94 |
| 1,335,973 | A | * | 4/1920 | Kesselman .............. 297/233 X |
| 1,429,368 | A | | 9/1922 | Owler et al. ............... 297/95 X |
| 2,007,471 | A | | 7/1935 | Landgrebe ................... 297/94 |
| 3,058,769 | A | | 10/1962 | Willson |
| 3,097,876 | A | | 7/1963 | Willson |
| 3,391,960 | A | | 7/1968 | Megargle et al. |
| 4,555,135 | A | | 11/1985 | Freeland ................. 297/237 X |
| 4,756,573 | A | | 7/1988 | Simin et al. ............ 297/238 X |
| 5,000,505 | A | | 3/1991 | Kawashita et al. ........ 296/65.1 |
| 5,121,964 | A | | 6/1992 | Fourrey et al. .............. 297/237 |
| 5,322,341 | A | | 6/1994 | Harrison et al. .............. 297/94 |
| 5,335,963 | A | | 8/1994 | Muller et al. |
| 5,390,976 | A | * | 2/1995 | Doughty et al. ......... 297/234 X |
| 5,409,293 | A | | 4/1995 | Nagaska ..................... 297/236 |
| 5,524,962 | A | | 6/1996 | Fulgenzi et al. ........ 297/236 X |
| 5,524,965 | A | | 6/1996 | Barley .................... 297/256.16 |
| 5,549,353 | A | | 8/1996 | Gaudet et al. ...... 297/256.16 X |
| 5,639,141 | A | | 6/1997 | Hanemaayer ............. 296/64 X |
| 5,722,724 | A | | 3/1998 | Takei et al. ............. 297/114 X |
| 5,820,215 | A | | 10/1998 | Dreisbach .............. 297/256.16 |
| 6,199,945 | B1 | * | 3/2001 | Kim ............................ 297/94 |

FOREIGN PATENT DOCUMENTS

| | | | |
|---|---|---|---|
| DE | 3800-896 | 9/1988 | ................. 297/237 |
| EP | 348-374 | 12/1989 | ................. 297/238 |
| GB | 323296 | 1/1930 | ................. 297/383 |
| JP | 59-18028 | 1/1984 | ................. 297/94 |

* cited by examiner

Primary Examiner—Rodney B. White
(74) Attorney, Agent, or Firm—Welsh & Katz, Ltd.

(57) ABSTRACT

A vehicle seat allowing an occupant to either face in a first direction or a second opposed direction is provided. The seat comprises a base that allows for the back rest of the seat to be moved, alternatively, forward or back on a cushion such that the user may select whether he will ride facing towards the direction of the automobile's movement or facing away from the direction of movement. The seat further comprises a pop-up seat cushion which allows the occupant to open up the seat cushion to sit more securely within the seat cushion while having side cushions for added support and impact resistance. The present apparatus provides better security for small children and pregnant, elderly or otherwise more fragile adults. The seat allows children to be placed such that they do not face the direction of oncoming traffic and instead ride in the more generally agreed to be secure direction of travel.

13 Claims, 20 Drawing Sheets

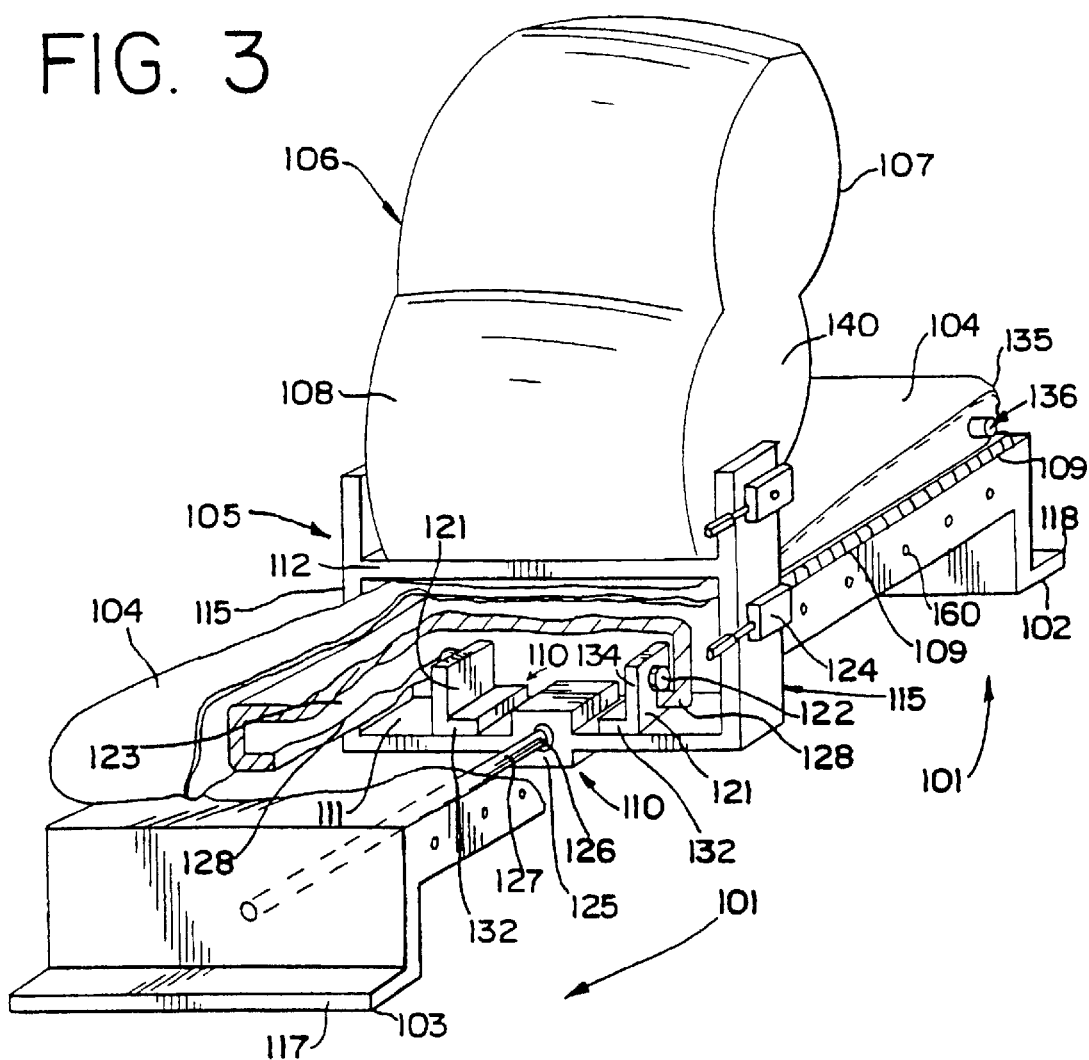

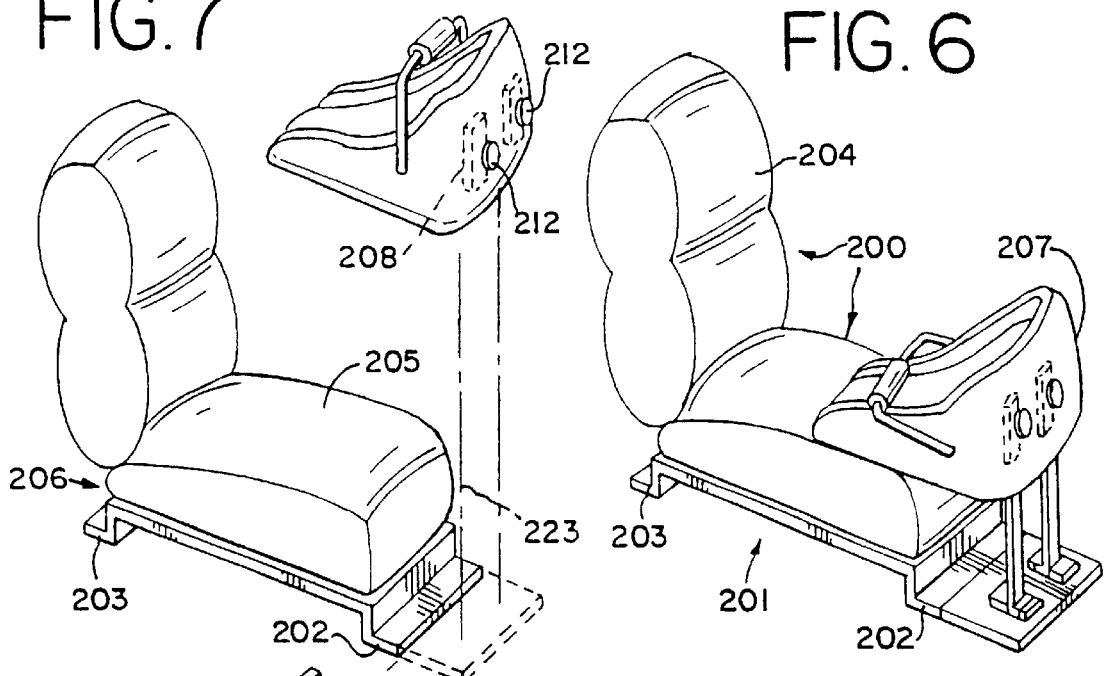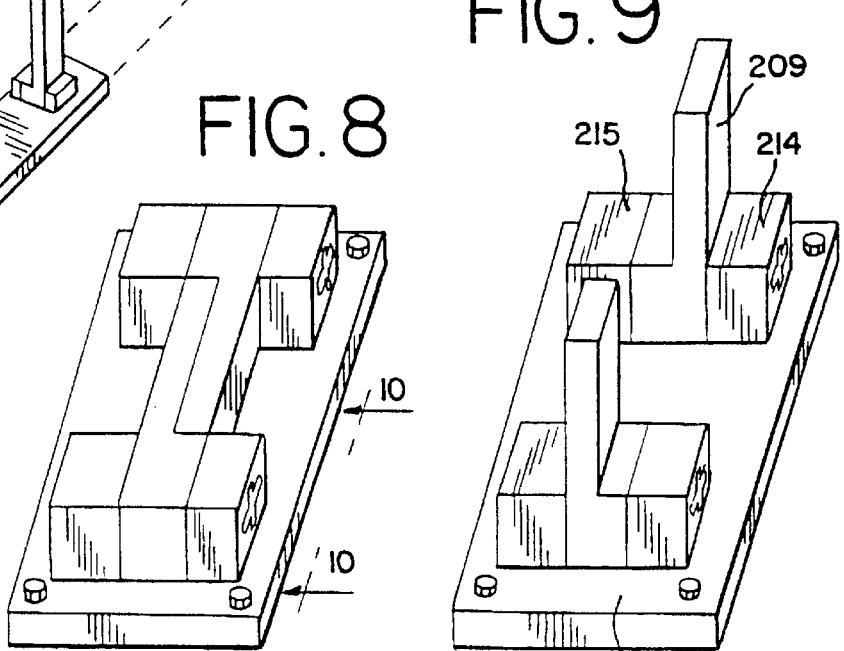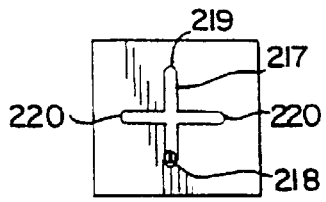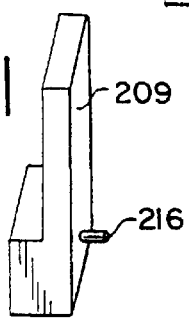

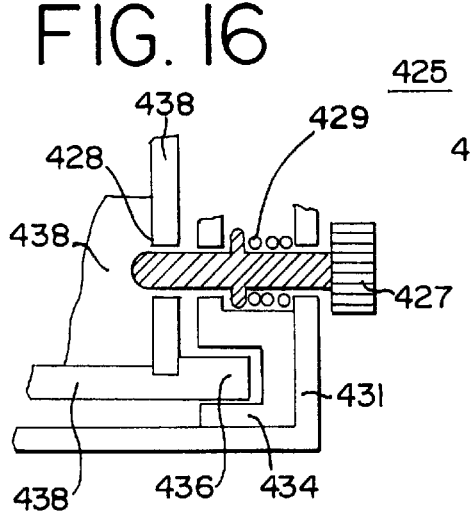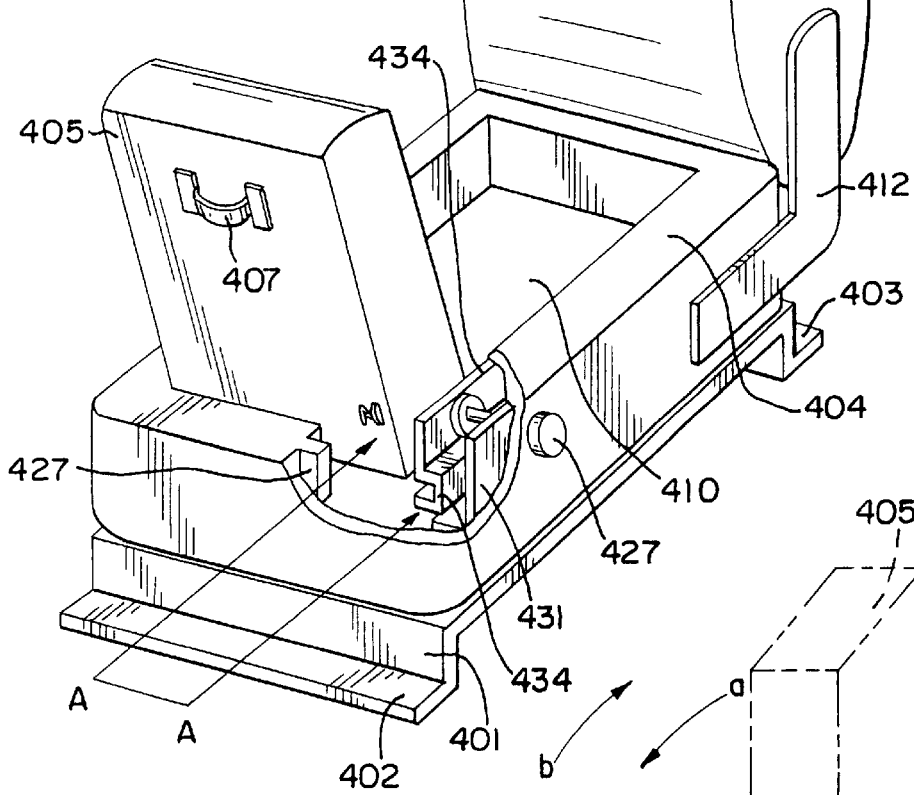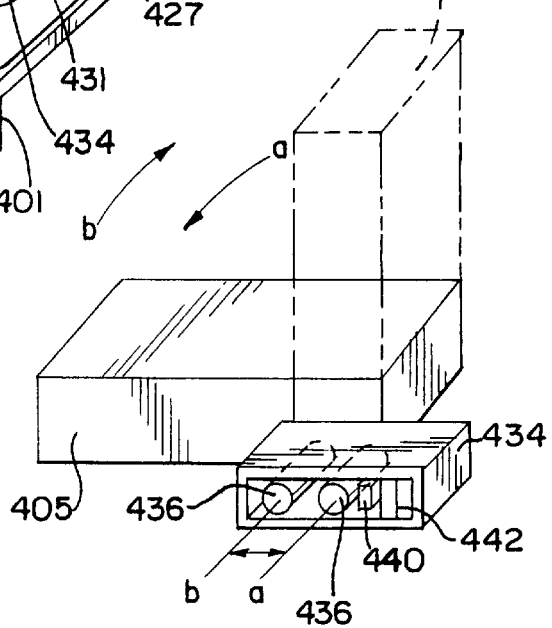

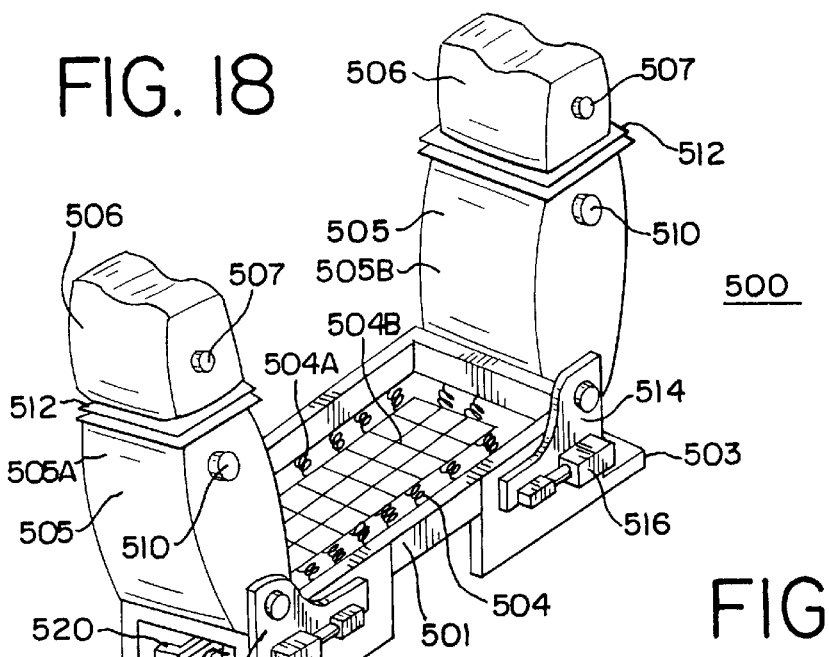
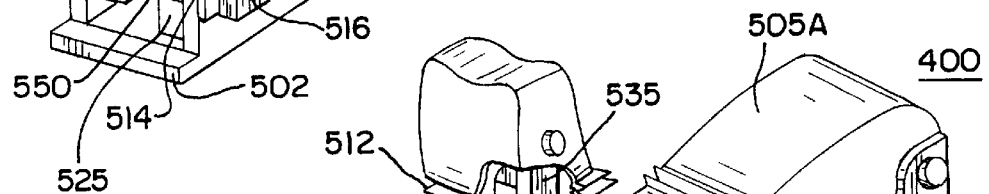
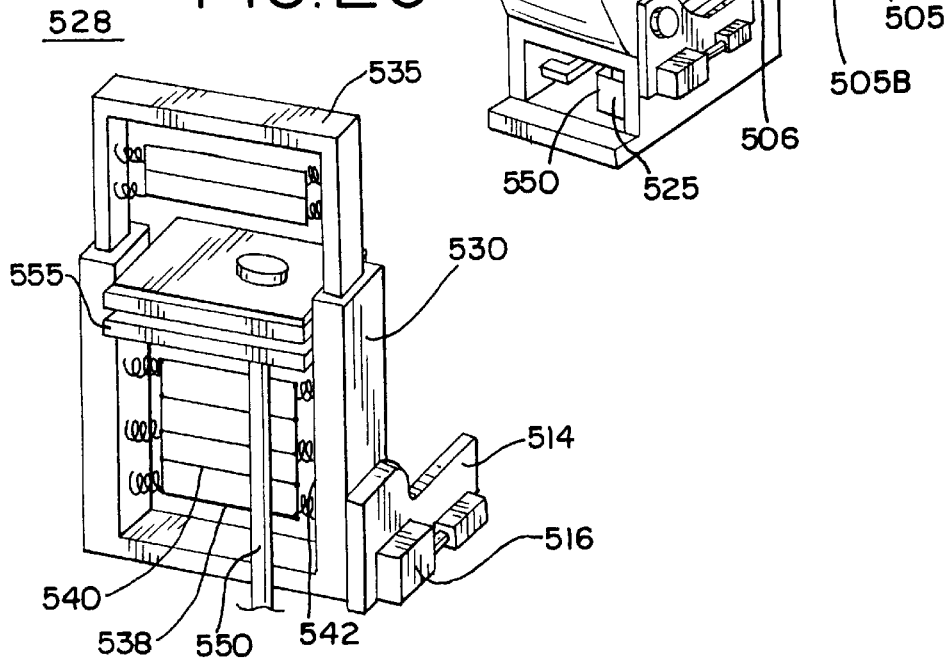

VEHICLE SEAT FOR REVERSIBLE OCCUPANT TRAVEL

The present application is a continuation-in-part of U.S. application Ser. No. 09/480,407, filed Jan. 11, 2000, which is a continuation-in-part of U.S. application Ser. No. 09/368,193, filed Aug. 4, 1999, now U.S. Pat. No. 6,199,945 issued Mar. 13, 2001.

BACKGROUND OF INVENTION

The present invention generally relates to vehicle occupant seats, and in particular to new and improved occupant seat assemblies wherein the seat assemblies may be modified to enable an occupant to face opposite the vehicle's normal forward traveling direction.

Vehicle occupant safety, particularly the safety of small children and infants is a major concern to both vehicle owners as well as vehicle manufacturers. In most vehicles, the occupant seats are oriented in a forward-facing position. Conventional vehicle seats, for example, include backrests engaged by the occupant's back while disposed on the set facing in the forward direction of normal vehicle travel. In the event of a sudden stop, such as generally occurs in a vehicle front or rear end collision, the occupant will generally be subjected to a sudden force of inertia acting in the direction of vehicle travel. The potential for injury resulting from such collisions has been reduced somewhat by the mandatory use of seat belts. Although seat belts have proven to be relatively safe for adults, the same cannot be said for small children and infants. Moreover, forward-facing vehicle seats, and particularly front seats, subject children to numerous front seat hazards, such as high-pressure air bags, and generally provide inadequate child restraint systems even with contemporary children's car seat. It is highly important that a vehicle provide the utmost safety for all occupants large and small. It is also important that added vehicle safety remain affordable for car owners as well as manufacturers.

Most forward-facing vehicle seats are fixed in a forward directed position and are incapable of modification to improve safety by reducing the inertia forces imparted to forwardly facing passengers in the event of a collision or the like. Attempts have been made to provide adjustable vehicle passenger seats that may be positioned for forwardly facing or rearwardly facing passenger use. However, known vehicle passenger seats adaptable for both forward-facing and rearward-facing positions are generally relatively complex and expensive, and require at least a 180 degree seat base rotation.

The known reverse-adjustable vehicle seat designs require a complete redesign of the entire base of the seat in order to incorporate both a forward and rearward-facing feature. Thus, a need exists for a vehicle assembly that overcomes the disadvantages of known vehicle seats and provides safety for infants and small children, as well as adults.

SUMMARY OF THE INVENTION

In accordance with the present invention a vehicle seat, comprising a seat frame having a seat back, a first seating area, comprising a seat cushion, and a second seating area generally below said seat cushion is provided. The seat cushion is comprised of at least two cushion elements, the cushion elements each have a first end, which are in contact with each other, such that they are generally abutting one another on one end, in a first position. Each cushion element is pivotally attached to the seat base at a second end (the end opposite from the end which abuts the other cushion element), such that the cushion elements may be pivoted apart, from one another, to an open position, to reveal a second seating area. The cushion elements can subsequently be pivoted back to re-form the first seating area. When the cushion elements are pivoted apart, and the second seating area is exposed, the pivoted up cushion elements become arm rests and side protection elements.

In the preferred embodiment of the present invention, the pop-up cushion elements are provided with an internal frame that provides support for the cushion elements when they are pivoted out and form a protective structure about an individual seated in the lower seating area of the car seat. For this reason, the seat structure of the present invention provided ideal safety support for a child seat or for persons in fragile states such as pregnant women, young children and the elderly.

In the illustrative embodiment, the seat of the present invention is also provided with a back rest that may be adjusted such that the rider may face in the direction of forward vehicle travel or alternatively, may face away from the direction of forward vehicle travel. It has been found that traveling in a rearward position provides greater safety and survivability for passengers. The present invention provides several different means of moving a back seat rest from a first, forward facing position, to a second rearward facing position. With the seat in a position such that the passenger is in a rearward facing position, a child restraint seat, having a seat-back attachment collar, may be used to providing an exceptionally safe mode of child transportation. Further, the parent applications of the present applications, which are incorporated herein in their entirety by reference, include a number of other means for providing seats with alternative seating positions.

Further objects, features and advantages of the present invention will become apparent from the following detailed description when taken in conjunction with the accompanying drawings wherein like reference numerals designate like elements throughout several views.

BRIEF DESCRIPTION OF THE DRAWINGS

FIG. 3 is a perspective view of the movable backrest assembly of FIG. 1 but with the back support assembly moved to a position mid-length of the seat base and with portions broken away to illustrate the backrest positioning mechanism;

FIG. 4 is a perspective view schematically illustrating the contour of the cushion type seat base employed in the seat assembly of FIGS. 1 and 3 when the backrest is positioned generally midlength of the seat base;

FIG. 5 is a perspective view of the cushion type set base of FIG. 4 but schematically showing the seat base contour with the backrest applying pressure to an end of the inflated seat base.

FIG. 6 is a perspective view of a vehicle seat assembly in accordance with another embodiment of the present invention that enables an infant or small child to sit in a rearwardly facing position;

FIG. 7 is an exploded perspective view of the vehicle seat assembly of FIG. 6;

FIG. 8 is a perspective view of the mounting assembly for the child restraint seat of FIG. 6 but with the pivotal support bars in down non-use positions;

FIG. 9 is a perspective view similar to FIG. 8 but showing the pivotal support bars in upright support positions;

FIG. 10 is an elevational view taken along line 10—10 of FIG. 9, showing a crossshaped slot to receive a pivotal support bar.

FIG. 11 is a perspective view of a pivotal support bar, employed in the mounting assembly of FIG. 9 with a guide pin;

FIG. 15 is a perspective view of a vehicle seat assembly of FIG. 14A shown with the rearwardly facing seat in the upright position and with portions broken away to show the frame locking system that enables an infant or small child to sit in a rearwardly facing position;

FIG. 16 is an elevational view of the frame locking system taken along lines A–A' of FIG. 15.

FIG. 17 is a perspective view of a portion of the frame locking system and the pop-up seat back of FIGS. 14A and 14B with the seat back shown with solid lines in the down position and show in phantom lines in the upright position.

FIG. 18 is a perspective view of an alternate embodiment of a vehicle seat assembly in accordance with the present invention that enables modification for rearward facing passenger seating;

FIG. 19 is a perspective view of the vehicle seat assembly of FIG. 18 but illustrating the headrest portion, shown with portions broken away to show the air bag, in an extended position and the movable seat back portion in a downward position on the seat base to facilitate rearward facing passenger seating; and FIG. 20 is a perspective view of the extension frame located within the internal portion of the seat back and headrest portions of FIG. 19.

DETAILED DESCRIPTION

Figure 1:
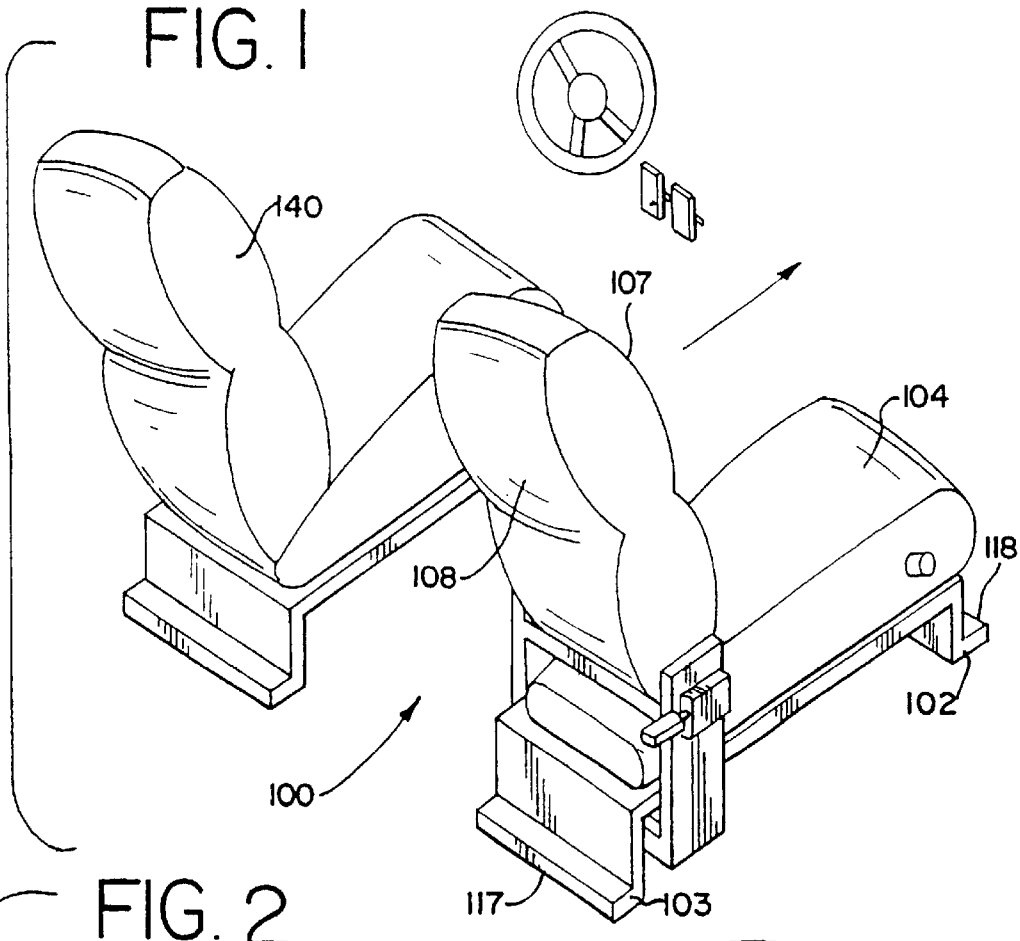
FIG. 1 is a perspective view of an embodiment of a vehicle seat assembly in accordance with the present invention that enables modification for rearward facing passenger seating.
Figure 2:
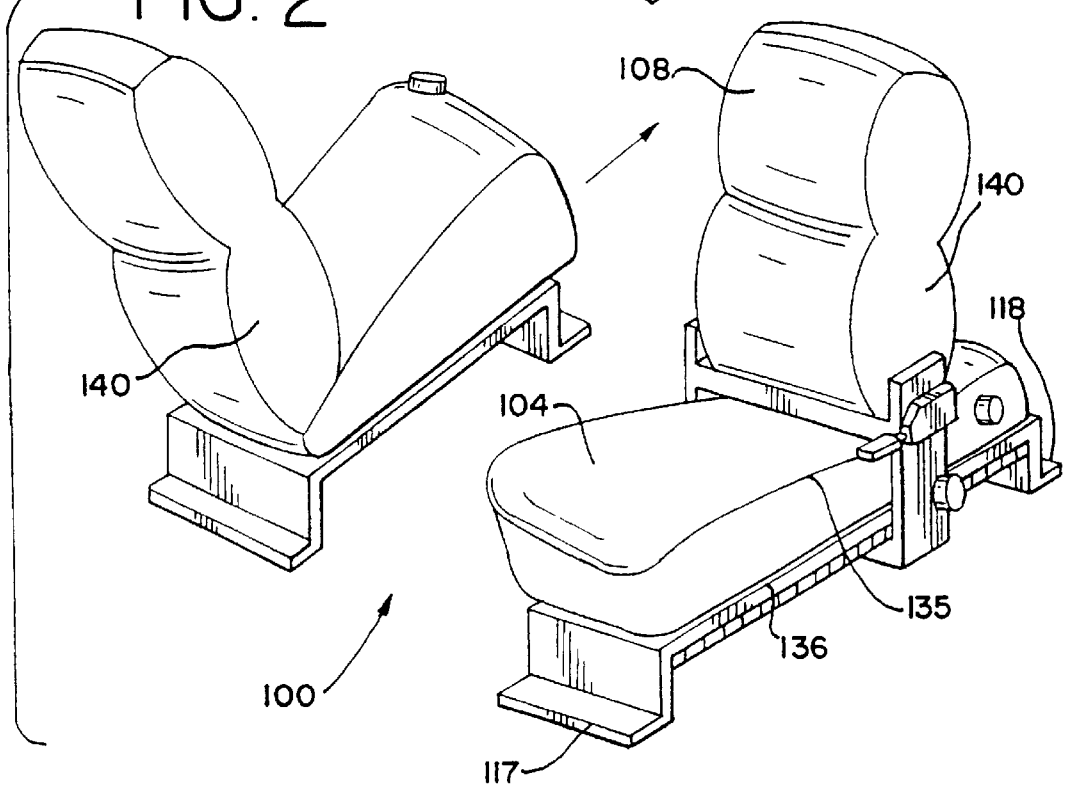
FIG. 2 is a perspective view of the vehicle seat assembly of FIG. 1 but illustrating the movable backrest portion in a forward position on the set base to facilitate rearward facing passenger seating.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section ("Detailed Description") relates to a requirement of the United States Patent Office, and should not be found to be limiting to the subject matter disclosed herein.

Referring now to the drawings, and in particular to FIGS. 1–5, a vehicle seat 100 for a vehicle (not shown) is constructed in accordance with one embodiment of the present invention. The vehicle seat 100 provides for both occupant travel facing in a forward or first direction, and occupant travel facing in a rearward or second direction. The vehicle seat 100 includes a seat frame 101 having a front flanged edge 102 and a posterior flanged edge 103 for securing the vehicle seat directly to the vehicle floor (not shown). Alternatively, the seat frame 101 can be mounted to a conventional slidable track (not shown) enabling forward and backward positioning of the seat frame 101, if desired.

The vehicle seat 100 includes a seat base 104 mounted on top of the seat frame 101, a back support assembly 105 and a slide assembly 110. The seat base 104 covers the seat frame 101, preferably in a manner spanning an entire length and width of the seat frame 101. The seat base 104 provides cushioned support for a seated occupant and has a variable thickness (t), defined by a top surface 135 and a bottom surface 136 of the seat base 104.

The back support assembly 105 enables occupant travel facing in a forward or first direction and occupant travel facing in a rearward or second direction. The back support assembly 105, including a backrest structure 106, plural support bars 115, and a first mounting plate 11. The backrest structure 106 rests in a generally vertical position, transverse to the seat frame 101. The backrest structure 106 is an integral structure with dual surfaces comprising a first backrest 107 and a second backrest 108 positioned in opposite directions.

When the back support assembly 105 is positioned at the posterior end 117 of the seat frame 101, the first backrest 107, in combination with the seat base 104 and seat frame 101 provide for occupant travel facing in a forward or first direction. To interchangeably provide for occupant travel facing in a rearward or second direction, the back support assembly 105 slides longitudinally from the posterior end 117 of the seat frame 101 to the front end 118 of the seat frame 101. In this arrangement, an occupant resting his back against the second backrest 108, faces in a rearward or second direction.

The back support assembly 105 engages an external track 109 and a slide assembly 110. The external track 109 and slide assembly 110 cooperatively facilitate longitudinal movement of the back support assembly 105 along the frame 101.

The back support assembly has support bars 115, which are vertically aligned with a side portion 140 of the backrest structure 106. The side portion 140 of the backrest structure 106 is pivotally mounted to the support bars 115. Preferably, the support bars 115 are bolted or coupled to a lower end of the side portion 140 of the backrest structure 106, in a manner enabling radial adjustment of the backrest structure 106. A radial positioning lever provides radial movement of said backrest structure 106 such that an occupant may adjust the backrest structure 106 to lock in an angular position comfortable for the occupant.

The support bars 115 are attached underneath the seat frame 101 with an interposing first mounting plate 111 as illustrated in FIG. 1. The first mounting plate 111 has two end portions, which are connected to the support bars 115. It is preferable that the first mounting plate 111 is welded to the support bars 115 for an optimally strong connection.

As previously mentioned, the slide assembly 110 facilitates the longitudinal sliding movement of the back support assembly 105 along the set frame 101. The slide assembly 110 includes a coupling member 121, which connects the first mounting plate 111 of the back support assembly 105 to a sliding member 122. Preferably, the coupling member 121 has a L-shaped cross-section, as seen in FIG. 3, providing a lower flanged portion 132 for connection to the first mounting plate 111 and an upright portion 134 for connection to the sliding member 122. The L-shaped coupling member 121 can be used in conjunction with a second L-shaped coupling member 121 such that cooperatively each coupling member 121 connect a sliding member 122 to the mounting plate 111, as seen in FIG. 3.

The sliding member 122 cooperatively engages an internal track 123 as illustrated in FIG. 3, such that the sliding member 122 slides along the internal track 123. The sliding member 122 can be a roller, a bearing, a slide rod, or any other device, which provides for low friction sliding in conjunction with an internal track 123.

The internal track 123 is mounted on an opposite side of the seat base 104, which may also be defined as an underside portion of the seat frame 101. The internal track 123 extends from the posterior end 117 of the set frame 101 to the front end 118 of the set frame 101 providing a flanged rail 128 for the sliding member 122 to slide from one end of the seat frame 101 to the other end. The internal track 128 may have two or more flanged rails 128 for engagement with multiple sliding members 110, if desired.

The slide assembly 110 includes a cylinder housing 125 and a longitudinal guide rail 127 for providing additional stability to the slide assembly 110 when the back support assembly 105 slides longitudinally along the seat frame 101. The cylinder housing 125 is preferably mounted on top of the first mounting plate 111 in a center portion of the plate to provide maximum support. The cylinder housing 125 has a bore 126 for engaging the longitudinal guide rail 127. The longitudinal guide rail 127 is rigidly connected to the posterior end 117 and frontal end 118 of the seat frame 101 in a manner that provides stabilization of the back support assembly 105 when the back support assembly 105 slides longitudinally along the seat frame 101.

The back support assembly 105 includes a longitudinal positioning lever 129, which operatively engages the external track 109 to control longitudinal positioning of the back support assembly 105 relative to the seat frame 101. The external track 109 is mounted to the side portion of the seat frame 110, extending from the posterior end 117 of the seat frame 101 to the front end 118 of the set frame 101. The longitudinal positioning lever 129, in a locked position, engages the external track 109, preventing movement of the back support assembly 105 along the external track 109 of the seat frame 101. For example, the longitudinal positioning lever 129 can have a stop (not shown), which rigidly engages a slot 160 on the external track thereby locking the back support assembly 105 in position.

The longitudinal positioning lever 129, in an unlocked position, provides free movement of the back support assembly 105 along the seat frame 101 and external track 109, such that the back support assembly 105 slides from the posterior end 117 of the seat frame 101 to the frontal end 118 of the seat frame 101.

As illustrated in FIG. 5, the seat base 104 has an inner chamber 150 containing an impressionable mass (not shown) to provide a resilient cushion. The mass can be fluid such as a gas or liquid or any combination thereof. The thickness (t) of the seat base 104 at a particular location depends on the volume of mass in the inner chamber 150 at that particular portion. The thickness (t) of the seat base 104 at a certain location varies such that when the volume of mass in the inner chamber 150 at a portion decreases, the thickness (t) of the seat base 104 at that corresponding location decreases. Conversely, when the volume of mass at a portion in the inner chamber 150 increases, the thickness (t) of the seat base 104 at that location increases.

The seat base 104 deforms such that when the back support assembly 105 is positioned at the posterior end 117 of the seat frame 101, a bottom portion of the backrest structure 106 depresses the seat base 104 at the posterior end 117, urging the matter inside the chamber to move from the posterior end 117 of the seat base 104 toward the front end 118, thereby increasing the thickness of the seat base at the front end 118, as illustrated in FIG. 5.

Furthermore, when the back support assembly 105 is positioned at the front end 118 of the seat frame 101, the bottom of the backrest structure 106 depresses the seat base 104 at the front end 118, causing the mass inside the chamber 150 to shift from the front end 118 of the seat base 104 toward the posterior end 117, thereby increasing the thickness of the seat base at the posterior end 117.

If desired, a second mounting plate 112 can be mounted underneath the backrest structure 106 in a position interposed between the support bars 115 such that the second mounting plate 112 depresses the seat base 104 and provides additional support to the back support assembly.

FIGS. 6 and 7 illustrate a vehicle seat 200 constructed in accordance with another embodiment of the present invention. The vehicle seat 200 provides occupant travel in both a forward-facing and rearward-facing position. The vehicle seat 200 comprises a set frame 201 having a front flanged edge 202 and posterior flanged edge 203 for securing the vehicle seat 201 to the vehicle floor (not shown). Alternatively, the set frame 202 can be mounted to a conventional slidable track (not shown) on the vehicle floor enabling forward and backward adjustment of the seat frame 102, if desired.

The vehicle seat 200 has a first backrest 204 positioned for occupant travel facing in a forward position or first direction. The seam frame 201 supports a seat base 205 and the first backrest 204. The first backrest 204 is pivotally connected to the posterior end 206 of the seat frame 201 such that a seated occupant, resting his back against the first backrest 204 faces in a forward position or a first direction.

The vehicle seat 200 has a second backrest 207, providing for occupant travel facing in a rearward position or second direction. The second backrest 207 is mounted to the top of the seat base 205. The second backrest 207 can be an assembly for carrying a baby as illustrated in FIGS. 6 and 7. The lower end of the second backrest 207 has a bore 208 for receiving a support bar 209 of a mounting assembly 210. The support bar 209 is inserted into the bore 208 and securely tightened to the inner wall of the bore 208 with a fastening screw 211. The fastening screw 211 engages the support bar 209, while inside of the bore 208, such that the support bar 209 abuts the inner wall of the bore 208. The fastening screw 211 has a turning knob 212 for tightening the abutment of the fastening screw 211, support bar 209, and the inner wall of the bore 208.

The mounting assembly 210 has a generally rectangular-shaped planar mounting plate 213, which can be securely connected to the floor of the vehicle, preferably adjacent to the front flanged edge 202 of the seat frame 201. Alternatively, instead of securing the mounting assembly 210 to the vehicle floor, the mounting assembly 210 can be directly attached to the front end 223 of the seat frame 201, if desired (not shown).

The mounting assembly 210 includes a mounting plate 213, a support bar 209 and a first housing 214, and an identical second housing 215. The support bar 209 is pivotally mounted between the first and second housings 214, 215, as illustrated in FIGS. 8 and 9. The lower end of the support bar 209 has a guide pin 216, as illustrated in FIG. 11. The first and second housings 214, 215 have a guide slot 217 located preferably in the center of the housings, which receives the guide pin 216. The guide slot 217 is preferably cross-shaped, having a lower branch 218, an upper branch 219 and adjacent side branches 220,220 as illustrated in FIG. 10.

The guide pin 216 locks in the guide slot branches 218 and 220, preventing movement of the support bar 209, when the support bar 209 is positioned in an upright or lowered position. The guide pin 216 locks into the lower branch 218 of the guide slot 217, preventing lateral movement of the support bar 209, when the support bar 209 is in an upright position. The guide pin 216 locks in a side branch 220 of the guide slot 217, when the support bar 209 is in a lowered position. The support bar 209 may be pivotally moved from an upright position, as illustrated by FIG. 8 into a lowered position as illustrated by FIG. 9, by pulling the support bar 209 upward and rotating the support bar 209 approximately 90 degrees, about the y-axis, into a position parallel relative to the mounting plate 213. The support bar 209 may be pivotally moved from a lowered position into an upright position by rotating the bar approximately 90 degrees, about the y-axis, from a lowered position, into an upright position and locking the guide pin 216 into the lower branch 218 of the guide slot 217.

Additional support to the second backrest 207 is provided by using plural support bars 209 and plural housing combinations attached to the mounting plate 213 such that the plural support bars 209 engage plural bores 208 in the second backrest 207. The plural support bars 209 interlock in a lowered position, as seen in FIG. 8.

Figure 12:
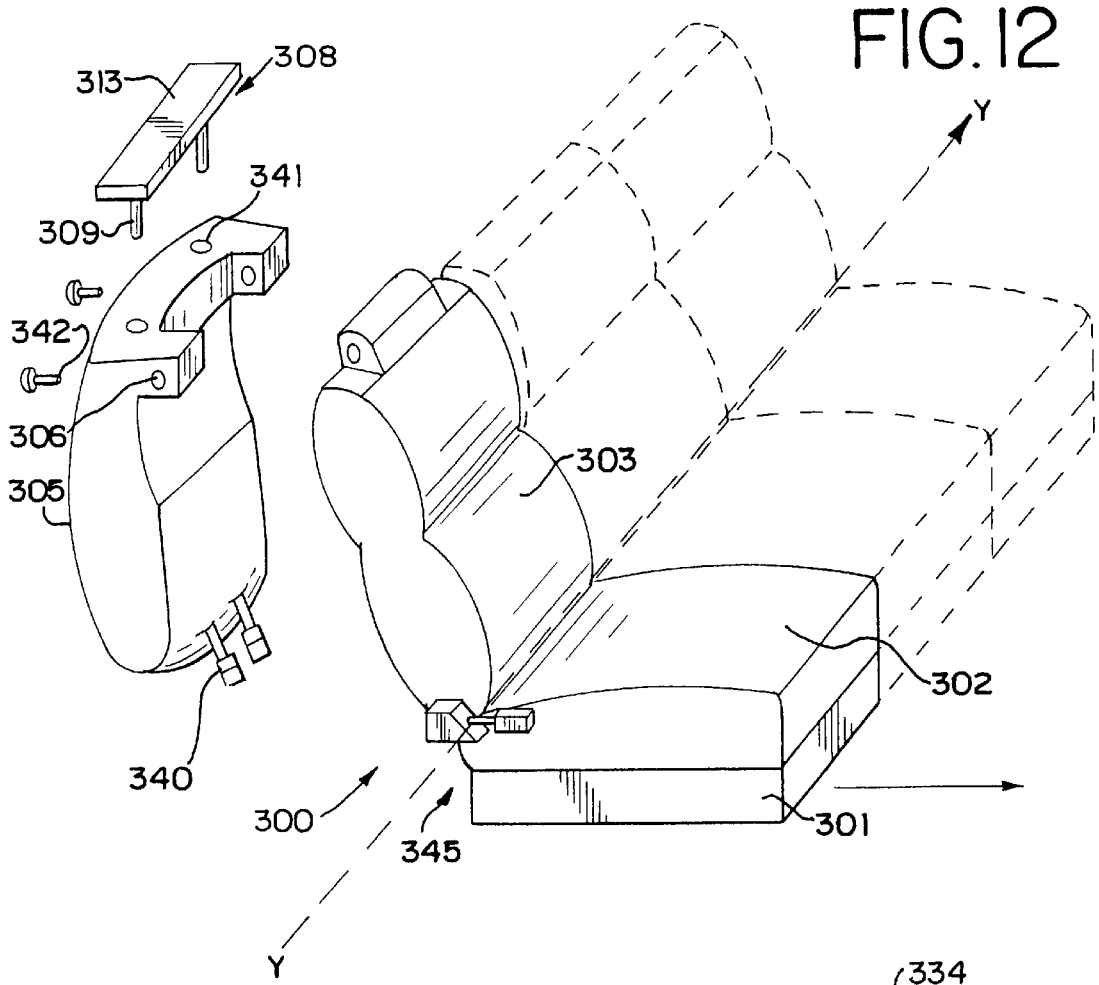
FIG. 12 is a perspective view of another embodiment of a vehicle seat assembly in accordance with the present invention that enables rearwardly facing passenger seating.
Figure 13:
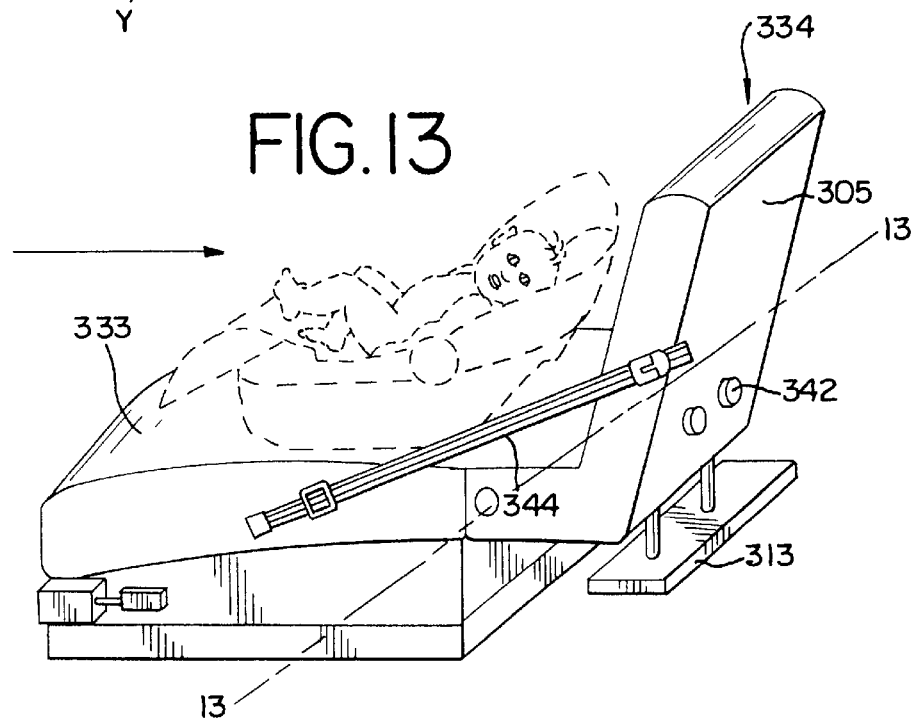
FIG. 13 is an exploded perspective view of the vehicle seat assembly of FIG. 12 but showing the primary backrest returned to its upright position for storing the forward or secondary backrest.

A vehicle seat 300 in accordance with another embodiment of the present invention is illustrated in FIGS. 12 and 13. The vehicle seat 300 includes a seat frame 301, which provides support to a seat base 302. The seat frame 301 has a first backrest 303, which is pivotally connected to the posterior end 345 of the seat frame 301. When the first backrest 303 is positioned in an upright position as shown in FIG. 7, an occupant seated on the seat base 302 faces in a forward position or first direction. A second backrest 305 may be mounted to a back portion 333 of the first backrest 303 providing storage for the second backrest 305 as illustrated in FIG. 12.

The vehicle seat 303 can be modified to provide occupant travel facing in a rearward position or a second direction. This is accomplished by pivoting the first backrest 303 (about the y-axis) from the upright position into a lowered position, as illustrated in FIG. 13. In this configuration, the face of the first backrest 303 horizontally engages the seat base 302 in a parallel position. The back surface 333 of the first backrest 303 form a second seat base 333. As illustrated in FIG. 13 the second backrest 305, is pivotally connected to the vehicle seat 300, particularly to the first backrest 303, such that an occupant seated on the second seat base 305 with his back resting against the second backrest 305, faces in a rearward position or second direction.

The upper portion of the first backrest 303 has slotted-bores 306 such that the lower portion of the second backrest 305 may be securely hinged to the upper portion of the first backrest 303 along a hinged axis (line 13—13) using any form of bolting or coupling means 315. The second backrest 305 is hinged to the upper portion of the first backrest 303 such that the second backrest 303 forms a second occupant seat 334.

As aforementioned in the previous embodiment, a mounting assembly 308, particularly a support bar 309 is inserted into the lower portion of the second backrest 305 through a bore 341. The support bar 309 is securely fastened to the inner wall of the bore 341 by a fastening screw 342. The fastening screw 342 is inserted into the back of the second backrest 305, securely fastening the support bar 309 to the inner wall of the bore 341. The mounting plate 313 is securely mounted to the inside of the vehicle. A hinged rod 344 connects preferably the middle portion of the first backrest 303 to preferably the middle portion of the second backrest 305 such that the second backrest 355 is prevented from moving along the hinged axis (13—13). If desired, plural hinged rods 344 can be used for connecting the sides of the first and second backrests 303, 305 for additional support. The second backrest 305 has a seat belt 340 for securing an occupant to the vehicle seat 300.

Figure 14A:
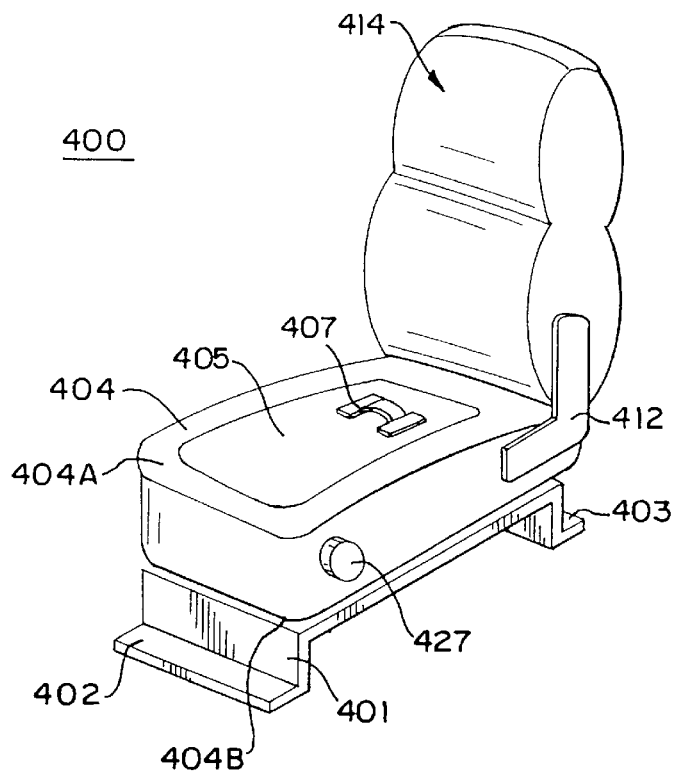
FIG. 14A is a perspective view of an alternate embodiment of a vehicle seat assembly in accordance with the present invention shown with the rearwardly facing seat in the down position.
Figure 14B:
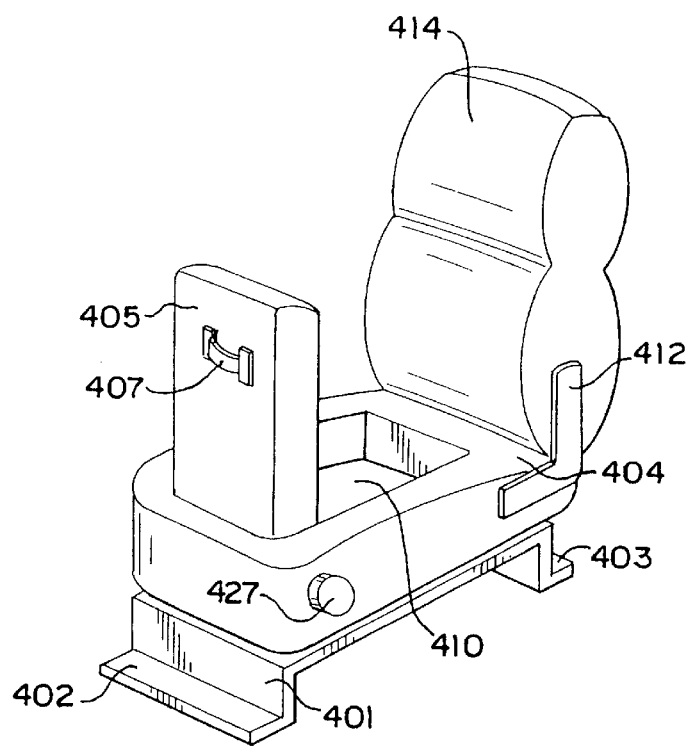
FIG. 14B is a perspective view of a vehicle seat assembly of FIG. 14A shown with the rearwardly facing seat in the upright position that enables an infant or small child to sit in a rearwardly facing position.

FIGS. 14A, 14B and 15, show a vehicle seat 400 for a vehicle (not shown) constructed in accordance with one embodiment of the present invention. The vehicle seat 400 provides for both occupant travel facing in a forward or first direction, and occupant travel facing in a rearward or second direction. The vehicle seat 400 may include a seat frame 401 having a front flanged edge 402 and a posterior flanged edge 403 for securing the vehicle seat 400 directly to the vehicle floor (not shown). Alternatively, the seat frame 401 may be mounted to a conventional slidable track (not shown) enabling forward and backward horizontal positioning of the seat frame 401 with respect to the vehicle floor, if desired by a passenger.

The vehicle seat 400 may include a seat base 404 mounted on top of the seat frame 401, a back support assembly 412 and a seat back 414. When the back support assembly 412 is positioned at the posterior end 403 of the seat frame 401, the seat back 414, in combination with the seat base 404 and seat frame 401 provide for occupant travel facing in a forward or first direction. Seat back 414 may be pivotally connected to back support assembly 412 so that seat back 414 may be adjusted by the user to fit his or her preferred seating arrangement. The seat base 404 may cover the seat frame 401 and may span an entire length and width of seat frame 401. Seat base 404 may provide cushioned support for a seated occupant and may have a variable thickness (t), defined by a top surface 404a and a bottom surface 404b of the seat base 404. Located within seat base 404 may be an inner seat frame 431, as shown in FIG. 15.

Positioned within seat base 404 may be a pop-up seat back 405. As shown in FIGS. 15–16, seat back 405 may comprise a lifting device 407, such as a handle, an inner support frame 438 and one or more frame locking systems 425. The frame locking system 425, which also may provide for pivotably mounting the seat back 405 to the seat base 404, may be located substantially as shown in FIGS. 15–17 and may comprise a frame locking rod 427, a locking hole 428 defined by and positioned in an inner support frame 438, a spring 429 positioned over the locking rod 427, a shaft guide 434, a shaft 436 fixed to the inner support frame 438, a spring plate 440 and a spring 442. As shown in FIG. 14A, seat back 405 may be in the downward position or as shown in FIG. 14B, seat back 405 may be easily moved to the upward position by pulling on lifting device 407, such as for example a handle. When seat back 405 is in the upward position, hidden seat 410, formed by a recess for example in seat base 404, is visible and ready for use. In one embodiment of vehicle seat 401, a child may sit in seat 410 and rest his or her back against seat back 405. In this configuration, the child would be facing in the direction opposite to the vehicle's traveling direction. In another embodiment, an infant carrier seat, which is commonly know in the art, may fit in and be secured in the seat 410.

As shown in FIGS. 15–17, during use, a user pulls on lifting device 407 which pulls open pop-up seat back 405 and exposes to view hidden seat 410. As seat back 405 is being opened, seat back 405 may pivot with respect to seat base 404 and shaft 436 may move substantially horizontally through shaft guide 434 from position "a" to position "b" as shown in FIG. 17. Once seat back 405 is completely in the upright position, frame locking rod 427, which may be pulled back against the force of spring 429, is then released and the rod 427 travels into locking hole 428 which is located in the seat back's inner support frame 438. Once the rod 427 is fully positioned in hole 428, the seat back 405 may be firmly locked in position with respect to the seat base 404. Further, as shown in FIG. 17, in another embodiment, a spring plate 440 and spring 442 may be positioned within the shaft guide 434 substantially as shown in FIG. 17. In this embodiment, as the shaft 436 travels toward the "b" position, the spring 442 and spring plate 440 press against the shaft 436 and contribute to the opening of the seat back 445.

Referring now to FIGS. 18 and 19, shown is yet another alternate embodiment of a vehicle seat 500 for a vehicle (not shown) constructed in accordance with the present invention. The vehicle seat 500 may provide for both occupant travel facing in a forward or first direction, and occupant travel facing in a rearward or second direction. The vehicle seat 500 may include a seat frame 501 having a front flanged edge 502 and a posterior flanged edge 503 for securing the vehicle seat 500 directly to the vehicle floor (not shown). Alternatively, the seat frame 501 may be mounted to a conventional slidable track (not shown) enabling forward and backward horizontal positioning of the seat frame 501 with respect to the vehicle floor, if desired. In this embodiment, a position control arm 520 may be provided for the user to adjust the desired horizontal location of the vehicle seat 500 with respect to the vehicle floor.

The vehicle seat 500 may include a support assembly 504, which may be constructed of springs 504a and wire 504b arranged in a criss-cross pattern, seat backs 505 mounted on top of the seat frame 501, headrests 506 movably mounted to the seat backs 505, and back support assemblies 514 pivotally connecting the seat backs 505 to the seat frame 501. In one embodiment, a flexible, expandable cover 512, which may be for example accordion shaped, may be positioned and attached to the headrest 506 and the seat back 505 as shown in FIGS. 18 and 19.

When the seat back 505 is in the upright position at the posterior end 503 of the seat frame 501, the seat back 505, in combination with the seat frame 501 and the seat back 505 located at the front edge 502 when in the lowered position, provide for occupant travel facing in a forward or first direction. Seat back 505 may be pivotally connected to back support assembly 514 so that seat back 505 may be adjusted by the user to fit his or her preferred seating arrangement. In one embodiment, seat back 505 may be angularly adjusted by a angle adjuster mechanism 516 as shown in FIG. 19. Angular adjustment mechanism 516 may be positioned near the back support assembly 514 and may provide for the back rest 505 to be positioned in a large number of different angles with respect to seat frame 501. When in the downward position as shown in FIG. 19, the seat back 505 and headrest 506 may cover the seat frame 501 and may span an entire length and width of seat frame 501. Seat back 505 in the downward position may provide cushioned support for a seated occupant and may have a variable thickness (t), defined by a top surface 505a and a bottom surface 505b of the seat back 505. Located within seat back 505 and headrest 506 may be an inner extension frame assembly 528.

In one embodiment, as shown in FIG. 20, inner extension frame 528 may comprise an inner extension frame lower portion 530, an inner extension frame upper portion 535, a support frame 538 that stretches along and is connected to the frames 530 and 535 substantially as shown in FIG. 20, an extension air bag 555 and an air hose 550 connected to the air bag. In one embodiment, support frame 538 may be constructed of springs 542 and wire 540 arranged in a crisscross pattern. Inner extension frame upper portion 535 may be located substantially within headrest 506 and inner extension frame lower portion 530 may be located within seat back 505. In one embodiment, air bag 555 is positioned as shown in FIG. 20 and is expandably connected to extension frames 530, 535. Also, in one embodiment an air pump 525 may be provided to deliver air through air hose 550 and into air bag 555. In another embodiment, an air inlet/outlet 510 may be provided to accept the air hose 550 so that the air hose 550 would be located external of the seat back 505. Also, air inlet/outlet 510 may be used to release the air and deflate air bag 555. This embodiment may provide for an emergency situation where the headrest 506 must be lowered but the vehicle's power system cannot operate the air pump 525. In yet other embodiments, headrest 506 may be manually extended away from seat back 505 by a user pulling the headrest 506 away from the seat back 505.

As shown in FIG. 19, during use, a passenger may push one of the seat backs 505 downward and into a lowered position on the seat frame 501. In one embodiment, the user may adjust the seat back angle adjuster mechanism 516 to control the angle of the seat back 505 with respect to the seat frame 501. As seat back 505 is being lowered into position, seat back 505 may pivot about back support assembly 514 with respect to seat frame 501. Once seat back 505 is completely in the lowered position, the headrest 506 of the second seat back 505, that is still in the upright position, may be raised away from seat back 505 so that the seat back 505 provides effectively more back rest support surface area for the user. In one embodiment, headrest 506 may be manually or automatically raised. For example, if headrest 506 is equipped to be automatically raised, the user simply activates air pump 525 which delivers air to air bag 555. As air bag 555 fills with air, it starts to expand and extend headrest 506 away from seat back 505. As headrest 506 is extending, cover 512 may similarly extend until headrest 506 is fully extended. In one embodiment, a locking switch 507 may be provided to lock the headrest 506 in the desired position. As shown in FIG. 19, this particular seat back 505 arrangement provides for a vehicle occupant to be positioned in the vehicle seat 500 so that the occupant is facing the opposite direction than the vehicle is traveling in.

Figure 21:
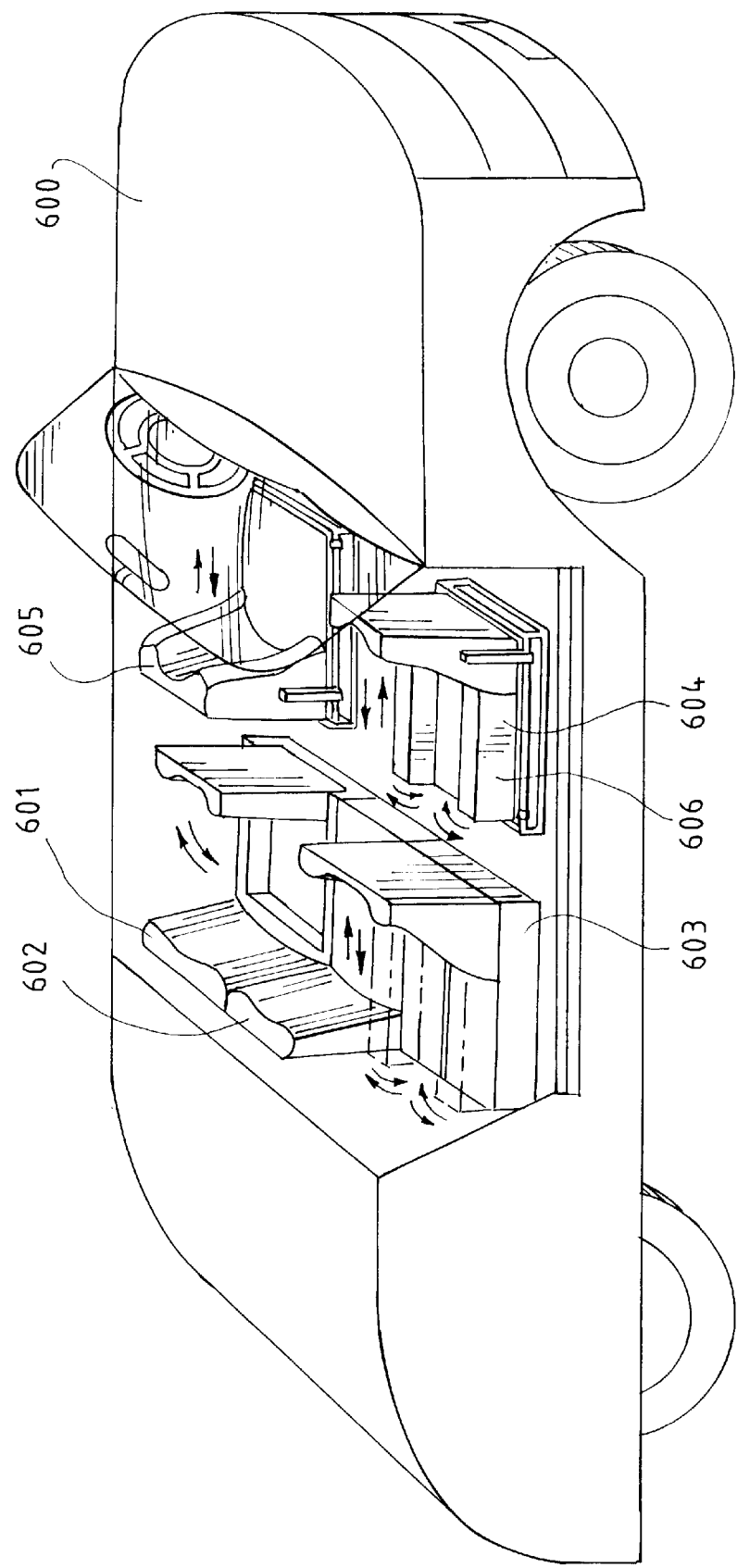
FIG. 21 is a perspective view, partially cut away, of an automobile constructed with the seats of the present invention.
Figure 22:
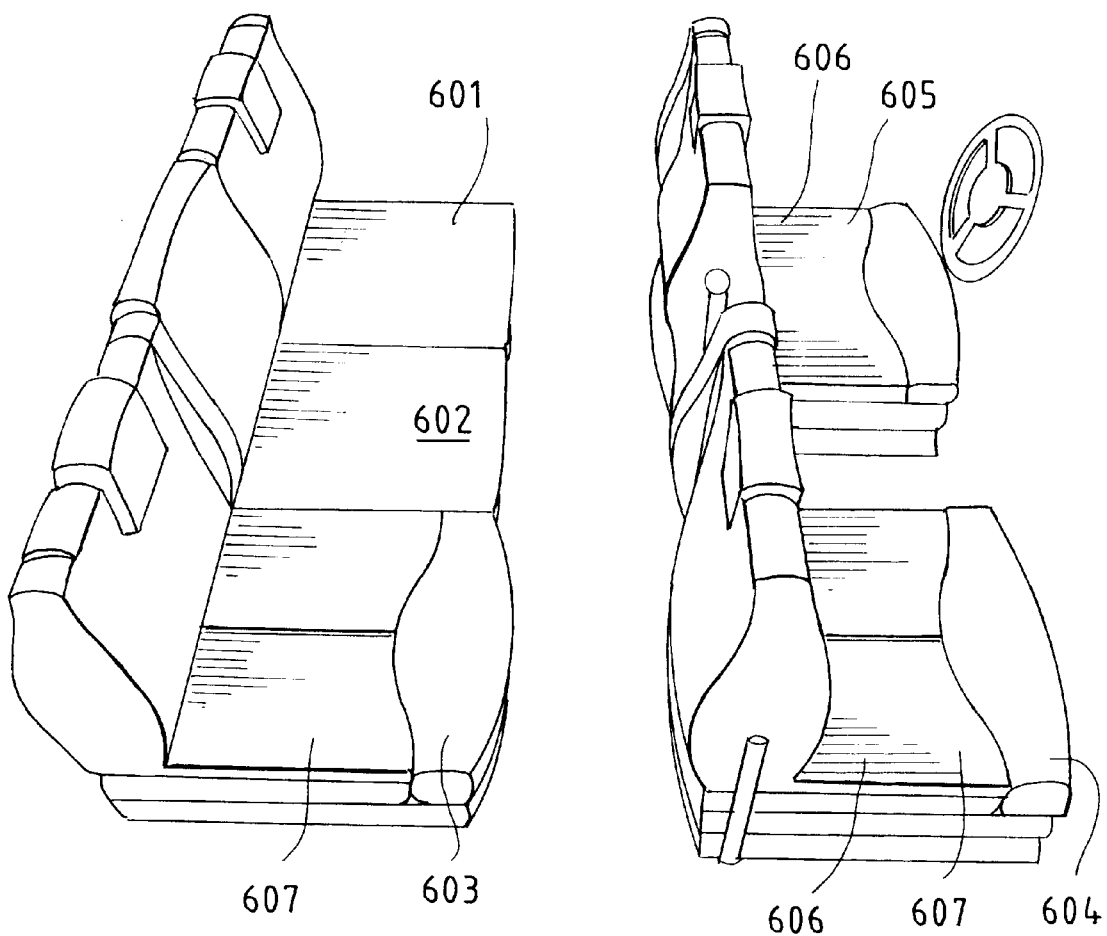
FIG. 22 is a perspective view of a set of seats constructed in accordance with the teachings of the present invention.

Referring now to FIG. 21 and FIG. 22, an automobile 600 is shown having five seats, respectively 601, 602, 603, 604 and 605. A number of the seats illustrated in FIG. 21 and FIG. 22 are of the type, as explained above, which allows the user to sit alternatively facing in a forward (or first) position and then in a backward (or second) position. While any one of the illustrated seats may be interchanged with any other, for illustrative purposes, seat 601 is of the type most clearly illustrated in FIG. 15 (above) and described in detail in the description of FIG. 15, above. Further, seat 602 is generally illustrated, in FIG. 21, as a typical automobile rear bucket seat which is well known in the art. Seats 603, 604 and 605 each are of another embodiment of the present invention, namely a type of seat which allows for the reversal of the occupant's seating position and for the "pop-up" of the seat cushions 606 in a manner to be described in detail below.

Referring to FIGS. 23 (23A, 23B and 23C), the rear seating area of automobile 600 (FIG. 21) is shown. In FIG. 23A, seat 603 is shown in an occupant facing forward or first position. Seat 603 comprises a seat area 606, having a seat cushion 607, a seat back 608, a base 610 and a slide control 612. FIG. 23B shows seat 603 in a backward facing or second position. FIG. 23C shows seat 603 in its second position with seat area 606 opened such that generally vertical sections 606a and 606b form arm rests about a lower seat area 614. In this manner a safer seating area is created for either an adult to sit in or for the placement of a child safety seat. It is to be understood that area 614 may have padding material so as to provide a comfortable place for seating or may be made of a generally inflexible so as to provide a solid base for a child restraining seat. It is to be further understood that child seat restraining straps or other means of retaining a child safety seat in a locked and secure position may be employed in area 614 without departing from the novel scope of the present invention.

Figure 23A:
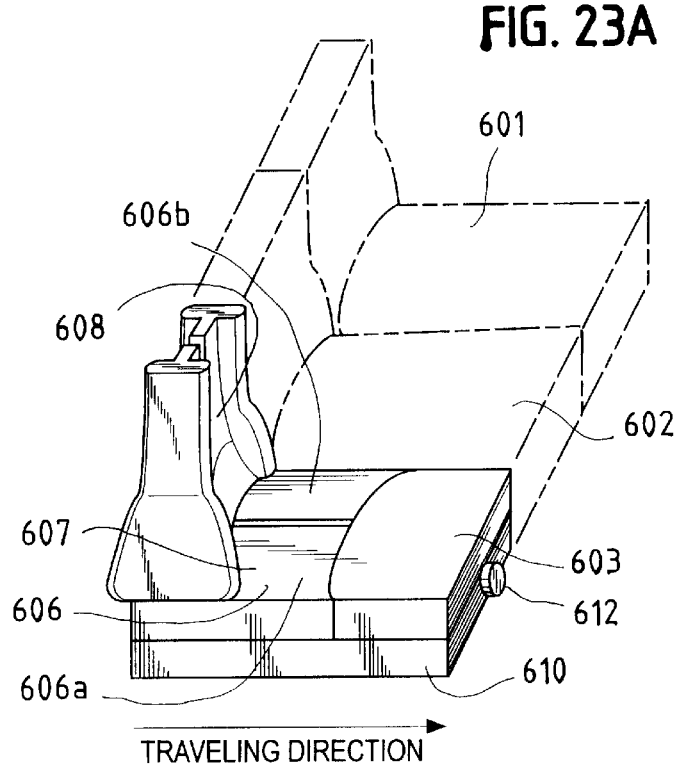
FIG. 23A is a perspective view of a row of seats constructed in accordance with the teachings of the present invention, two seats being shown in ghost view and the right rear passenger seat in a first position.
Figure 23B:
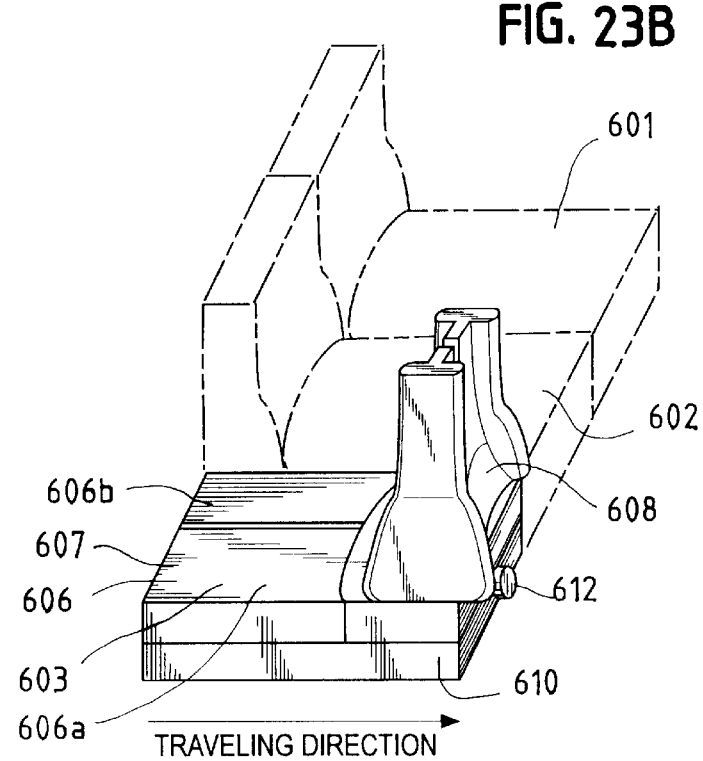
FIG. 23B is another view of the seats of FIG. 23A, with the right rear passenger seat is a second position.
Figure 23C:
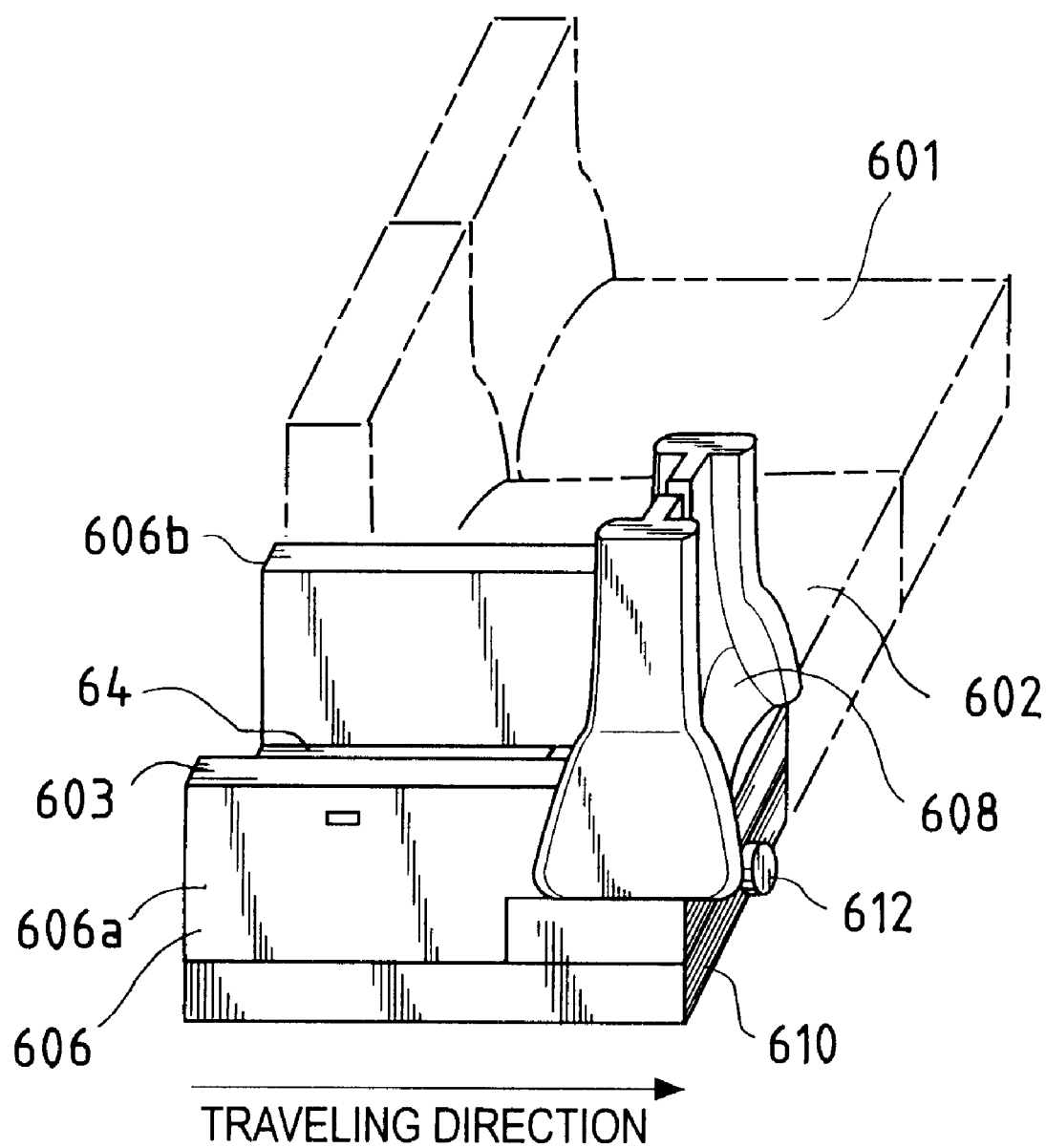
FIG. 23C is another view of the seats of FIG. 23B, showing the "pop-up" cushion feature of the present invention.
Figure 23D:
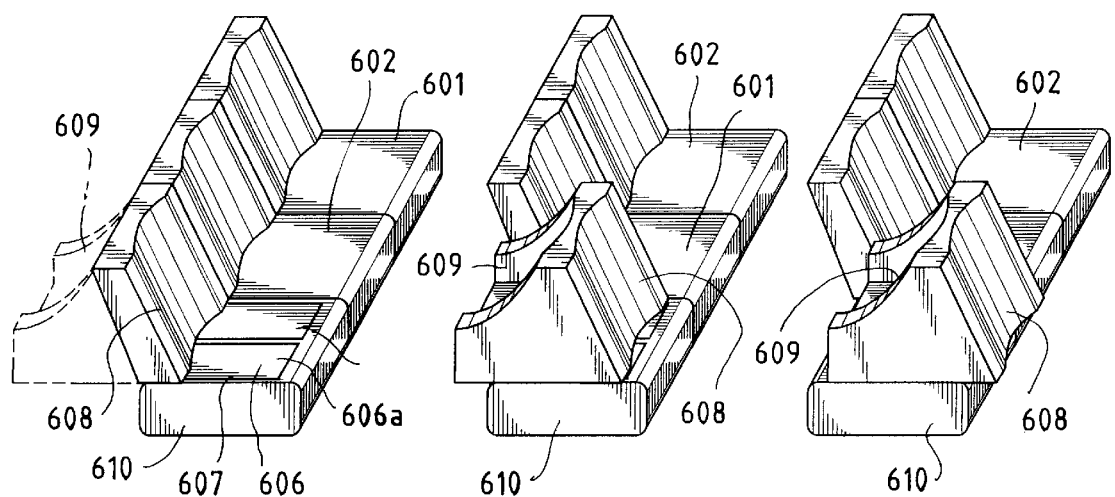
FIG. 23D is a series of perspective views of a row of seats constructed in accordance with the teachings of the present invention, showing the utilization of a child restraint seat system as part of the seat back of the seats of FIG. 23A.

Referring to FIG. 23D, it may be seen that a child restrain seat 609 may be attached to the back side of seat back 608 (in any manner known to those having skill in the art), such that when seat back 608 is slid forward, as described above, preformed child restrain seat 609 is available for use. It will be understood, by those having skill in the art, that seat back 608 can be constructed such that child restraint seat 609 is an integral part of seat back 608 without departing from the novel scope of the present invention. Further, it is envisioned that a seat back 608 may be constructed with a child restraint seat portion 609, such that a modular replacement seat back 608, not encompassing a child restraint seat, may be easily replaced into an automobile using the seats of the present invention. In this manner, when a child has grown and a child restraint seat is no longer necessary, the restraint seat 609 and back 608 combination may be removed and a seat back 608 placed in its stead, to provide the type of seat shown in FIGS. 23A, 23B and 23C without consuming the amount of room needed for the seat of FIG. 23D.

Figure 24:
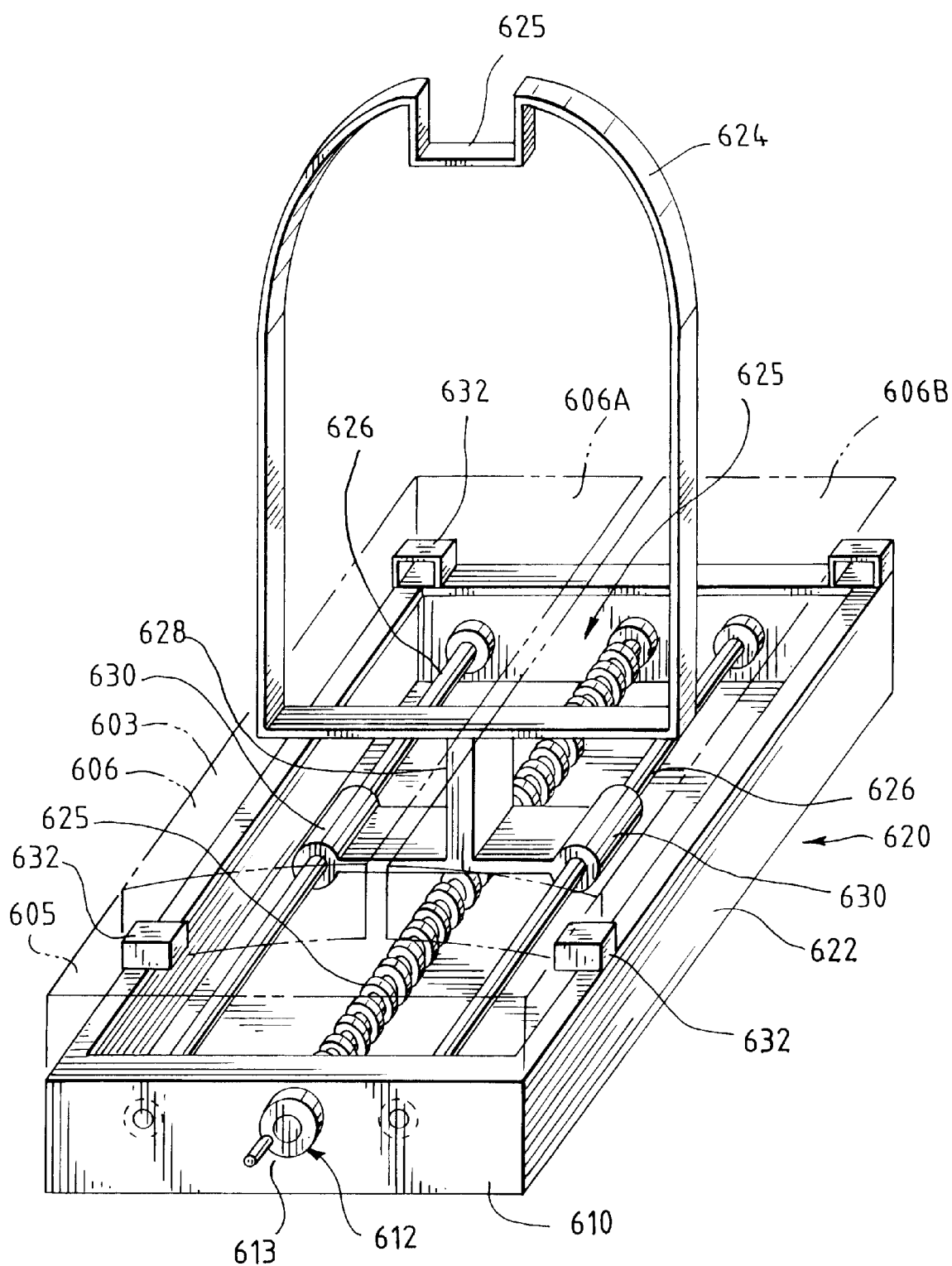
FIG. 24 is a perspective view of the interior frame and mechanism of a seat constructed in accordance with the teachings of the present invention.
Figure 24A:
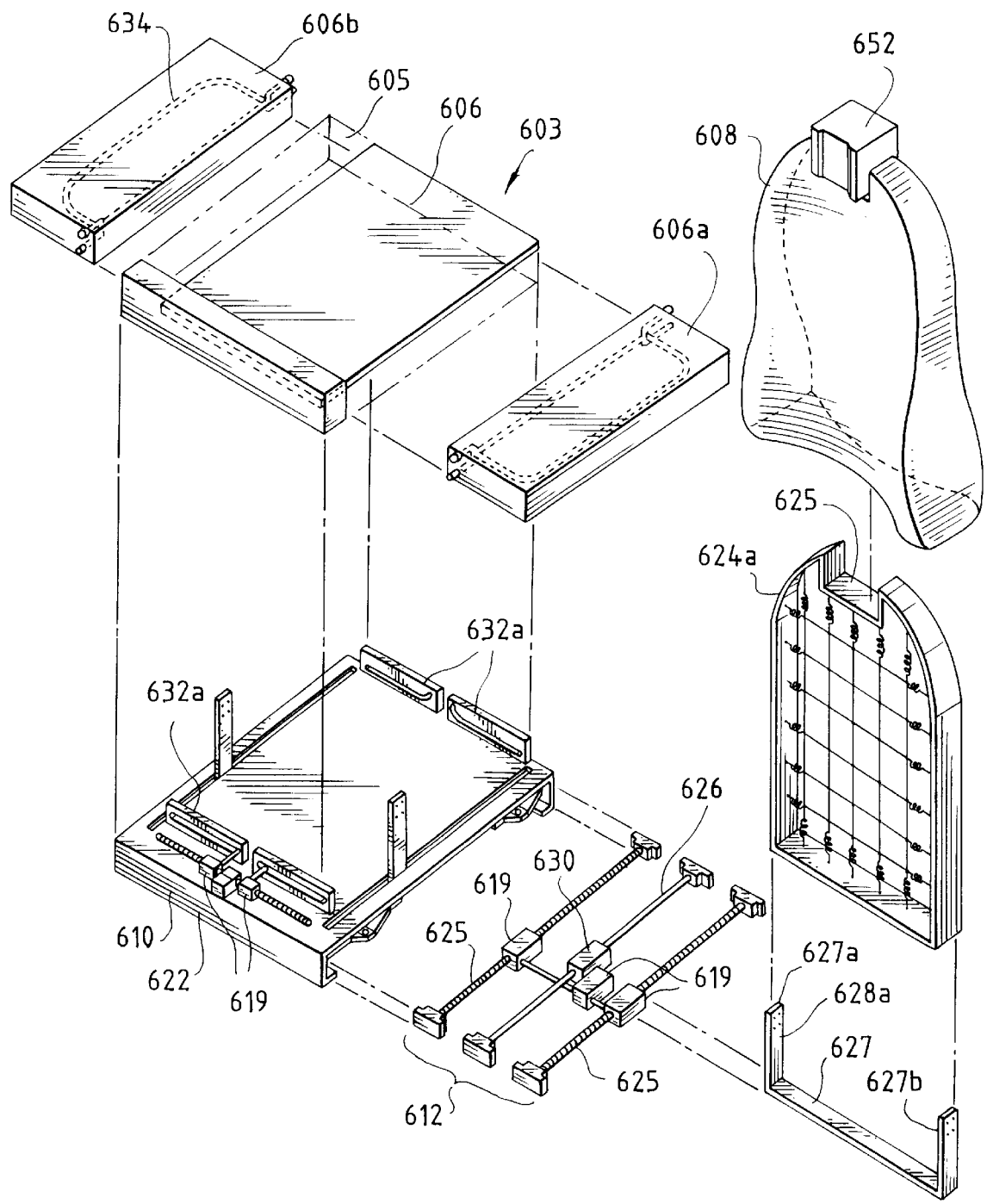
FIG. 24a is another perspective view of the interior frame and mechanism of a seat constructed in accordance with the teachings of the present invention.

Referring now to FIG. 24 and FIG. 24a, the interior workings of seat 603 are shown. In FIG. 24, the padding material 605 of seat area 606 is shown in broken lines to indicated its placement on the frame. It is noted, in FIG. 24, that the interior structure of the popup members (606a and 606b) have not been shown in order to more clearly show other elements of the seat structure. As shown in FIG. 24, a seat frame 620, comprising a base 622 and back support frame 624 are provided. Base 622 is a generally horizontal frame housing a slide control 612, a slide screw 625 and slide rails 626. As illustrated, slide control 612 comprises a hand crank 613, which when turned causes seat back 608 to slidably move from a first position to a second position and back. As shown in FIG. 24a, electric motors 619, utilized both to raise and lower section 606a and 606b of seat 606 (to form arm rests) and to cause seat back 608 to slide from a forward facing to a rearward facing position (and vice-versa) are provided. It is to be understood that electric motors 619 may be controlled by standard electrical switches (not shown), such as those presently used to control the position of electrically controlled automobile seats, from convenient locations in the automobile 600. It is to be further understood, that any type of slide control, including motor means, of a type not illustrated, for rotating slide control 612, may be employed without departing from the novel scope of the present invention.

Support frame 624 is shown to have generally the shape of a chair back. It is to be understood that support frame 624 may be formed of any shape that would provide back support for a person in an automobile, further, while a perimeter type frame is shown, it is to be understood that cross-members (not shown) and other structural support means may be provided without departing from the novel scope of the present invention. Support frame 624 is, further, provided with a head rest indentation 625, to accommodate a head rest structure (not shown) if desired. A back support stand 628 is provided attached to frame 624. It is to be understood that frame 624 and stand 628 may be attached in any suitable manner, including, but not limited to, welded, bolted, riveted or may be formed together by molding, casting or other means, without departing from the novel scope of the present invention.

Figure 23E:
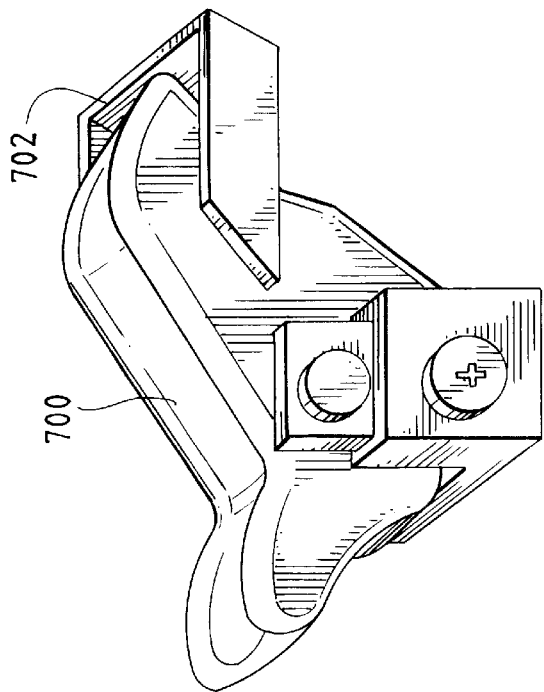
FIG. 23E is a perspective view of a child restraint seat that may be utilized with the seat of FIG. 23A.
Figure 23F:
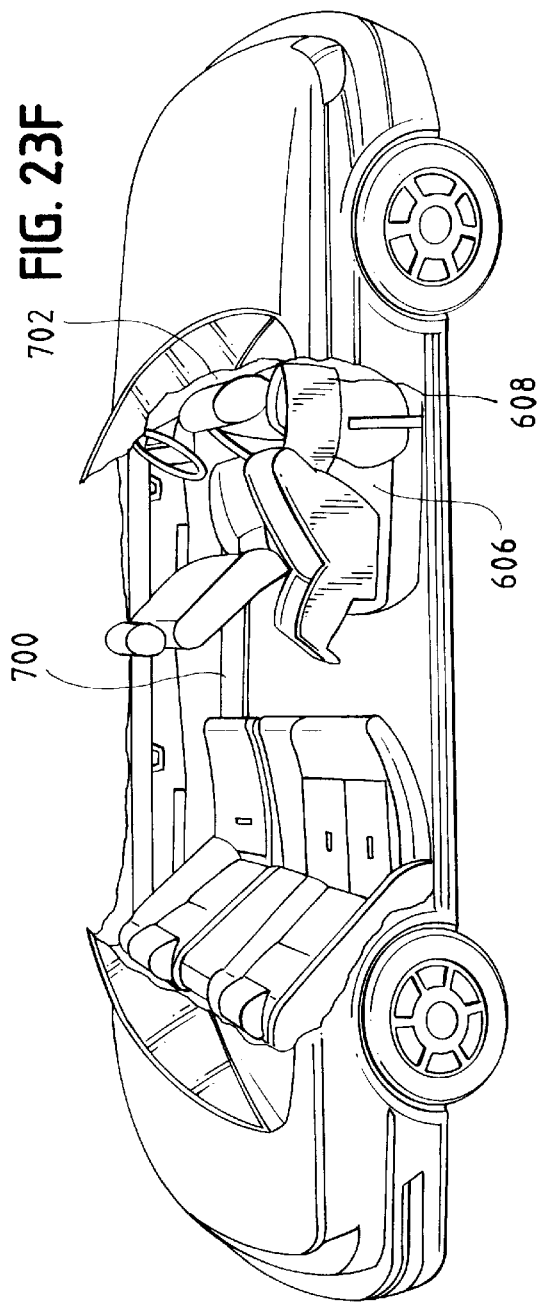
FIG. 23F is a perspective view of the seat of FIG. 23E in a first on-seat position.

Referring to FIG. 23E, a child seat 700, of a typical design is shown having a special back rest holder 702. Back rest holder 702 is designed such that the child seat 700 may be placed on a child seat while holder 702 fits about the seat back 608 of a bucket style seat. It is to be understood that any type of child restraint seat may be used without departing from the novel scope of the present invention. In a preferred embodiment, back rest holder 702 is made of rigid durable material, such as the material used to construct the typical child restrain system carrying handle, such that holder 702 is strong and durable. However, as illustrated in FIG. 23F, back rest holder 702 may be made of a non-rigid product, such as a reinforced cloth, steel belts, or any other material that may be placed about the seat back 608 and hold child restraint seat 700 in place. While a preferred embodiment of the present invention includes the placement of seat 700 into an automobile by threading seat back 608 through back rest holder 702, it is to be understood that back rest holder 702 may be constructed such that the user places the seat in position and then wraps a back rest holder 702 about seat back 608 and then fastens the back rest holder 702 such that child restraint seat 700 is properly secured to an automobile seat. Such devices as a buckle, an eye and loop fasteners, or fasteners of other types, may be used without departing from the novel scope of the present invention.

As illustrated in FIG. 24, stand 628 is provided with holding means 630 to engage slide rails 626 and screw engaging means (not shown) to mechanically engage sliding screw 625. Screw engaging means may be of any of a number of well known means used to move an object in response to the turning of a screw. As shown in FIG. 24a, a stand 628a having means to engage the sides of frame 624a (such as the upright sections 627a and 627b of frame member 627) is attached to slider means 621, allowing the electromechanical manipulation of seat back 608a. It is to be understood that while frame member 627 of a particular shape is shown and described, persons having skill in the art can substitute any type of frame member and attach such frame member to a motor, without departing from the novel scope of the present invention. When slide control 612 is engaged, either by hand rotation utilizing crank 613 or by use of any type of motorized means (engaged by remote push button or otherwise) known in the art, frame 624 and stand 628 are caused to move along slide rails 626. Such action places seat back 608 in a desired position, generally in a first or rider forward facing position or a second or rider rear facing position.

Figure 25:
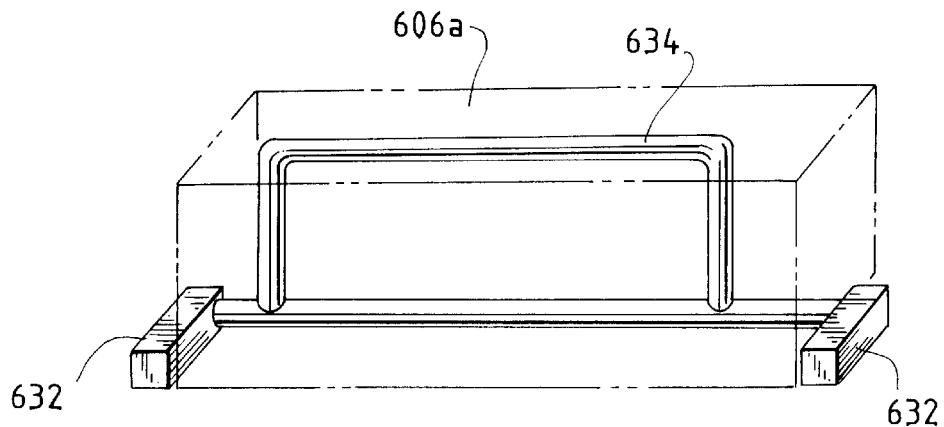
FIG. 25 is a perspective view of the frame of one element of the "pop-up" cushion feature of the present invention, showing placement of cushioning material in ghost lines.
Figure 25A:
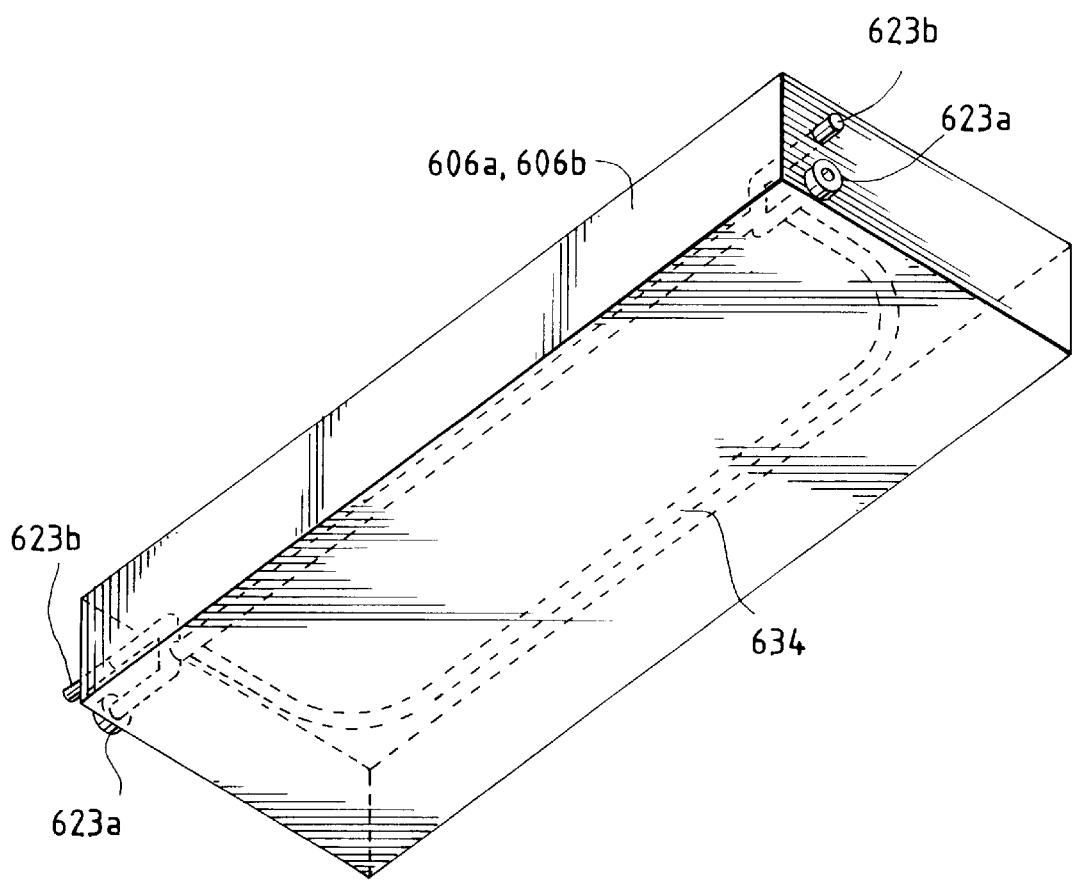
FIG. 25a is a perspective view of another embodiment of the frame of one element of the "pop-up" cushion feature of the present invention.

FIG. 24 further illustrates the placement of a plurality of pop-up arm rest (606a and 606b) attaching means 632. As shown in FIG. 25, pop-up arm rests 606a and 606b are generally comprised of a generally D-shaped support frame 634 having segments 634a which are pivotably inserted into attaching means 632 to allow frame 634, and the surrounding arm rest padding material 605 (shown in broken lines to indicate its position about frame 634), to pivot to either a desirable open position or to a closed position to make a seat cushion 607. FIG. 25a shows another embodiment of arm rest section 606a (identical to section 606b, not shown), having a roller 623a and pin 623b assembly for engagement with support means 632a and with a motor means 619. Such connection allows arm rest sections 606a and 606b to be opened and closed, as described above, using electromechanical means. It is to be understood that while a simple pivoting system is illustrated, pop-up arm rests 606a and 606b may be made to pop-up using various other means of pivoting well known in the art, without departing from the novel scope of the present invention.

In the operation of the seat of FIG. 24, the user would choose the preferred direction of travel and by operating crank 613, operate slide control 612 to move the seat back 624 to the desired position. The user would then decide whether to be seated on the seat cushion 606 (FIG.s. 22 and 23) or on the lower seat area 614. It is to be understood that lower seat area 614 may comprise padding material, generally of the type usually found in an automobile (such as that used in seat cushion 606), and coverings such as leather, velour, vinyl or other coverings found in automobile upholstery or lower seat area 614 may be of a hard surface designed for the placement of objects such as child safety seats or cargo, all without departing from the novel scope of the present invention. If the user decides to use the upper seat cushion 606, the user is then merely required to sit down and, for safety sake, use the lap and shoulder belt system generally available. However, should the user decide to use the lower seating area 614, pop-up arm rests 606a and 606b, which generally make up a large portion of seat cushion 606, may each be pulled up upon near their centers and pivoted towards the sides of the seat. In this manner, the seat cushion 606 is removed from the lower seating area 614 and arm rests 606a and 606b are formed. Arm rest 606a and 606b, having interior support frames 634, further, provide an added measure of safety from side impacts or jostling.

The use of a child safety seat within lower seating area 614, with seat back in the second rearward facing position, in conjunction with arm rest 606a and 606b (and support frames 634) provides excellent protection for an infant or child riding in a vehicle equipped in the manner suggested by the present invention. It is noted that lower seat area 614 may be equipped with special harness elements and elements that are complimentary to the locking elements of many child safety seats, so that a child safety seat may be easily installed in lower seat area 614 and may be held more safely and securely than by using seat belts.

Figure 26:
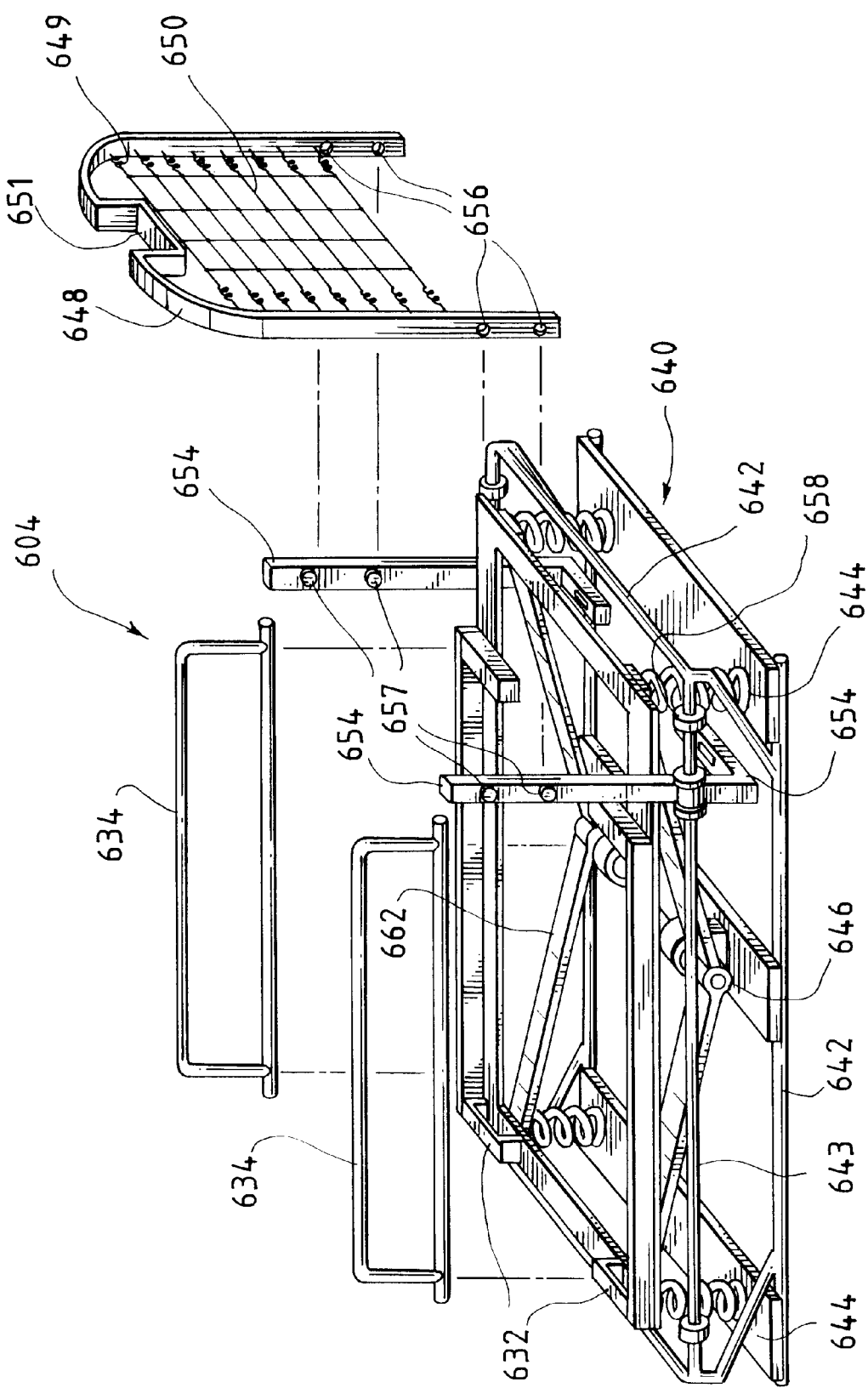
FIG. 26 is an exploded perspective view of the interior frame and mechanism of another seat cushion constructed in accordance with the teachings of the present invention.
Figure 26A:
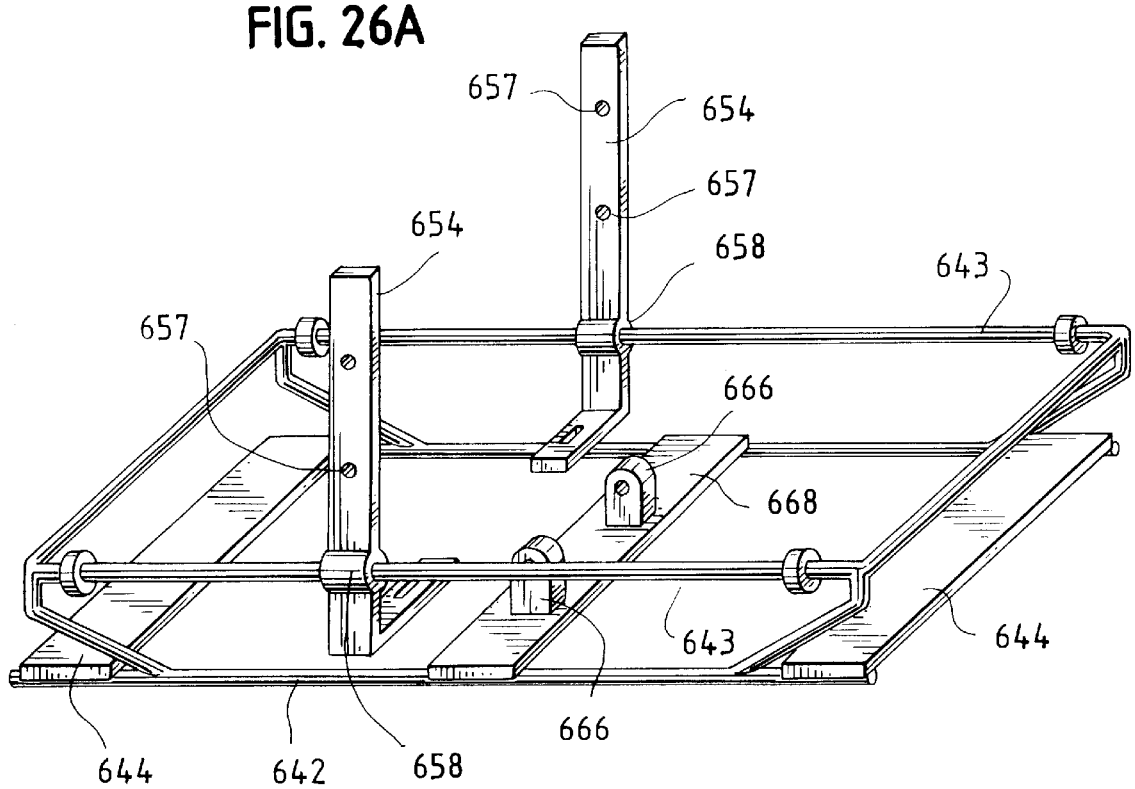
FIG. 26A is a perspective view of the mounting frame and other elements of the seat of FIG. 26.
Figure 28:
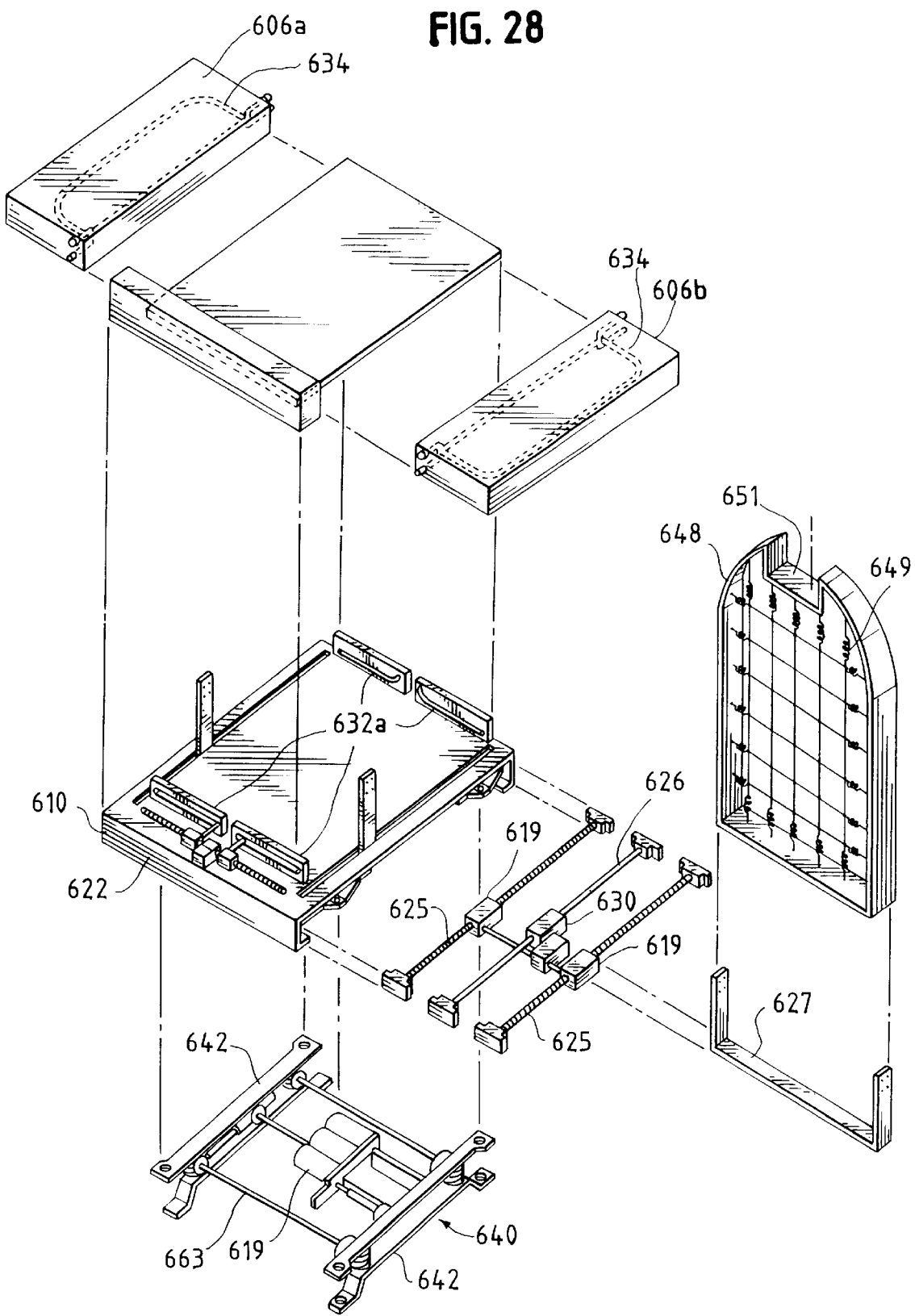
FIG. 28 is an exploded perspective view of another embodiment of the interior frame and mechanism of another seat cushion constructed in accordance with the teachings of the present invention.

An alternative construction of the safety seat of the present invention is shown in FIGS. 26, 26A, 26B, 27 and 28. FIG. 26 and FIG. 28 each show one embodiment of the interior structure of seat 604 (FIG. 21). It is to be understood that the manner of sliding the back of seat 604 from one end the seat frame to the other may be accomplished in any of the number of ways described in other embodiments of the invention disclosed herein and in its parent applications, without departing from the novel scope of these inventions.

As shown in FIG. 26 (and more closely in FIGS. 26a and 26b) and FIG. 28, seat 604 comprises an interior structure 640 having a frame 642, footings 644 and an interior rocking frame 646. As in the previous embodiment, seat 604 further comprises a back support frame 648, which as illustrated, comprises wire springs 649 and netting 650 to provide increased back support and comfort. Frame 648 further defines a space 651 for an optional head rest 652 (shown in FIG. 27). Support frame 648 is slidably attached to frame 642 through sliding support arms 654. In the illustrative embodiment, frame 648 is provided with fastener openings 656 and support arms 654 are provided with complementary fastener openings 657, through which bolts, rivets or other fasteners may be threaded to attach frame 648 to support arms 654. It is to be understood that any manner of attaching support arms 654 and frame 648 together may be used without departing from the novel scope of the present invention. Frame 642 further comprises upper rods 643 and support arms 654 each further comprise rod guides 658 which engage upper rods 643 to allow support arms 654 to slide from one end of frame 642 to the other, allowing seat back 648 to be placed either forward facing or rearward facing as desired.

It is noted that the present embodiment comprises similar elements as the previous embodiment, and that those elements function in the same way in the present embodiment. For example, the seat of the present embodiment comprises an upper seat cushion 606, pop-up arm rests 606a and 606b, lower seat area 614, interior support frames 634 for arm rests 606a and 606b, and support frame attaching members 632.

Frame 642 further comprises footings 644 through which frame 642 is securely attached to an automobile. Springs 660 are also provided so as to provide support at the ends of frame 642 no matter which placement of seat back 648 is selected. It is to be understood that while not clearly illustrated the present embodiment comprises locking means so that the seat back 648 may be locked into place in the forward or the rearward facing direction to protect the user from any harm which maybe caused by a unlocked seat. Locking means are illustrated and explained in other embodiments of the present invention shown and described in the parent applications hereto, which are incorporated by reference.

Figure 26B:
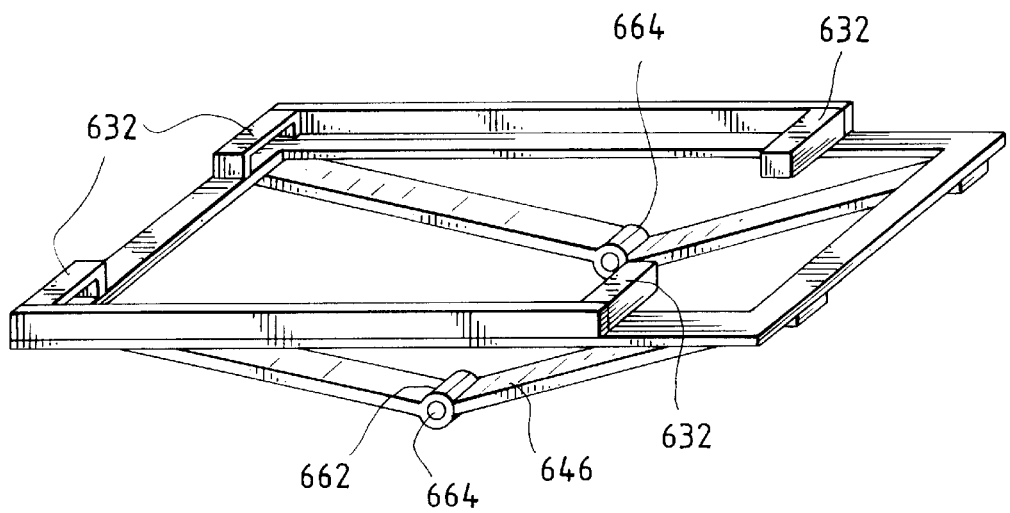
FIG. 26B is a partial perspective view of the direction changing element of the seat of FIG. 26.
Figure 27:
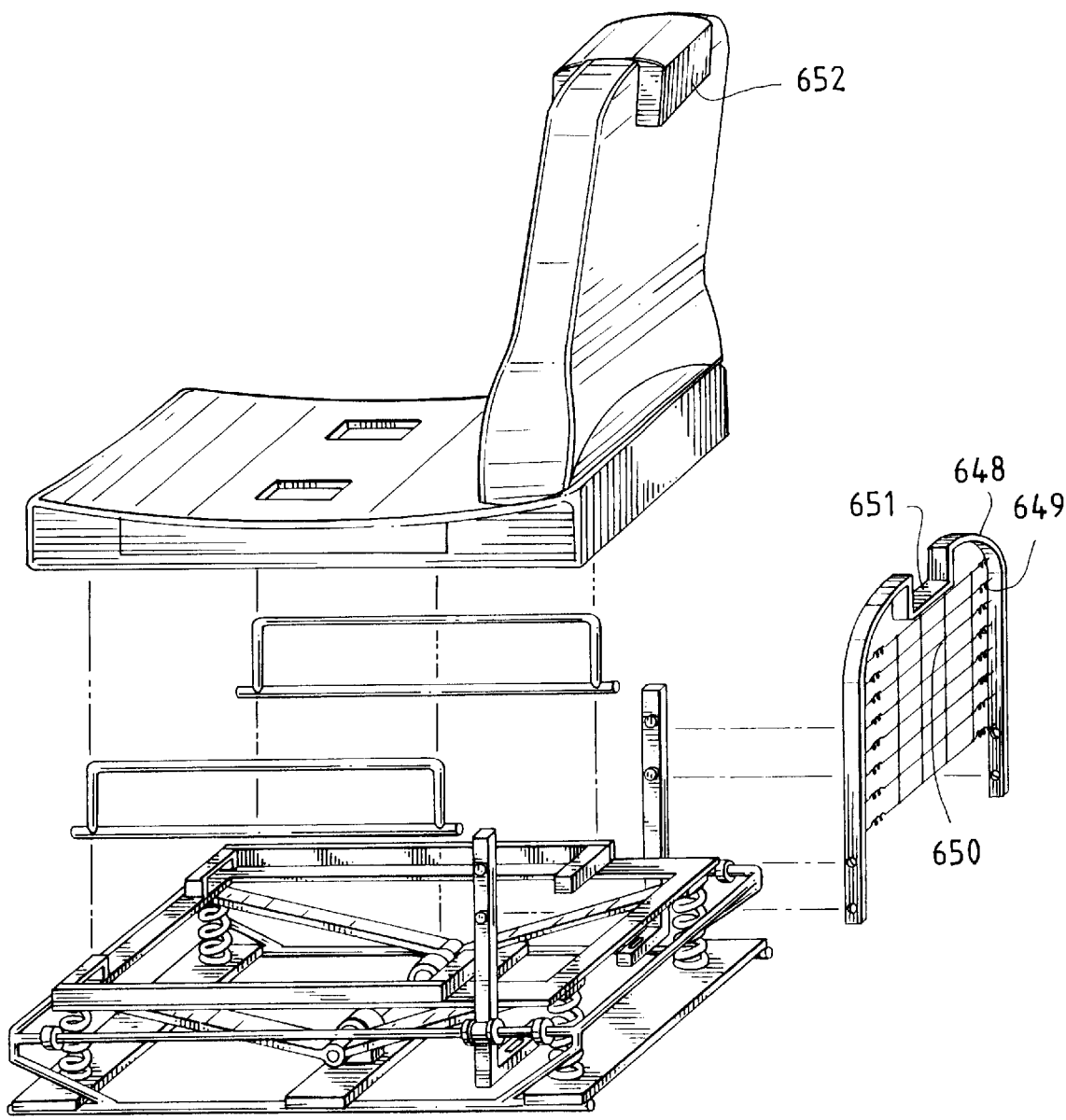
FIG. 27 is an exploded perspective view of the seat of FIG. 26.

As more clearly shown in FIG. 26b and FIG. 28, frame 642 also comprises a rocking frame 662 which provides support for the set cushion 606 and allows the side of the seat cushion 606 away from the seat back 648 to rise to give a more comfortable seating position to the user. As seat back 648 is slid from one end of seat frame 642 to the other, either manually as shown in FIG. 26 or through the use of motor means 619 as in FIG. 28, the rocking frame 662 pivots such that the section under the seat back 642 is pushed down and the other end rises. Rocking frame 663 comprises cylindrical connection tubes 664 which may be bolted, riveted or otherwise rotationally connected to complementary floor connection tabs 666 on floor stand 668. Floor stand 668 may be welded or otherwise attached to frame 642. It is to be understood that while mechanical and electronic rocking means are illustrated in FIG. 26 and FIG. 28, other means for rocking may be used without departing from the novel scope of the present invention. It is further to be understood, that any type of switch or other means to engage the rocking of frame 662 may be used, by persons having skill in the art, without departing from the novel scope of the present invention.

In the use of the present embodiments (FIG. 26 and FIG. 28), the user would choose the preferred direction of travel and would slide the seat back 648 to the desired position and lock it into place. The user would then decide whether to be seated on the seat cushion 606 (FIGS. 22 and 23) or on the lower seat area 614. If the user decides to use the upper seat cushion 606, the user is then merely required to sit down and, for safety sake, use the lap and shoulder belt system generally available. However, should the user decide to use the lower seating area 614, pop-up arm rests 606a and 606b, which generally make up a large portion of seat cushion 606, may each be pulled up upon near their centers and pivoted towards the sides of the seat. In this manner, the seat cushion 606 is removed from the lower seating area 614 and arm rests 606a and 606b are formed. Arm rest 606a and 606b, having interior support frames 634, further, provide an added measure of safety from side impacts or jostling.

The use of a child safety seat within lower seating area 614, with seat back in the second rearward facing position, in conjunction with arm rest 606a and 606b (and support frames 634) provides excellent protection for an infant or child riding in a vehicle equipped in the manner suggested by the present invention.

While illustrative embodiments of the present invention have been illustrated and described, it will be understood to those skilled in the art that changes and modifications may be made therein without departing from the invention in its broader aspects. Various features of the invention are defined in the following claims.

What is claimed is:

1. A vehicle seat, comprising:
   a seat frame having a seat back, a first seating area, comprising a seat cushion, and a second seating area generally below said seat cushion;
   said seat cushion comprising at least two cushion elements, said cushion elements each having a first end, said first ends being in proximity to each other in a first position and each cushion element being pivotally connected to said seat frame at a second end, such that said cushion elements may be pivoted apart to an open position, to reveal said second seating area, and can subsequently be pivoted back to re-form said first seating area.

2. The vehicle seat of claim 1, wherein each of said cushion elements is pivotally attached in said seat frame, generally at a side of said vehicle seat, such that when said cushion elements are pivoted apart arm rests are formed for said second seating area.

3. The vehicle seat of claim 2, wherein said cushion elements are caused to pivot by engagement of a motor.

4. The vehicle seat of claim 1, also comprising a seat back, said seat back being slidably mounted to said seat frame, said seat back being first positioned at a first end of said seat frame to provide back support for a person facing generally in the direction of vehicle forward travel and said seat back being alternately slidable, through the length of said frame, to provide back support for a person facing away from the direction of vehicle forward travel.

5. The vehicle seat of claim 4, wherein said seat back and frame comprise a sliding screw enabling said seat back to slide from said first position to said second position by manipulation of said sliding screw.

6. The vehicle seat of claim 5, wherein manipulation of said sliding screw seat is by use of a motor.

7. The vehicle seat of claim 5, wherein manipulation of said sliding screw is by rotation, and said sliding screw and said seat back are rotationally connected such that rotation of said sliding screw causes said seat back to slide alternatively from said first position to said second position and back.

8. The vehicle seat of claim 7, wherein said rotation of said sliding screw is by engagement of a motor.

9. The vehicle seat of claim 4, wherein said seat back and frame comprise at least one bar and at least one bar sliding mechanism such that said seat back slides on said frame from said first position to said second position.

10. The vehicle seat of claim 1, wherein a child restraint seat comprising a back rest holder is placed in said vehicle such that said seat back is within said back rest holder and said child restraint seat rests on either said first or second seating area.

11. A vehicle seat, comprising:
   a seat frame having a seat back, a first seating area, comprising a seat cushion, and a second seating area generally below said seat cushion;
   said seat cushion comprising at least two cushion elements, said cushion elements each having a first end, said first ends being in proximity to each other in a first position and each cushion element being pivotally connected to said seat frame at a second end, such that said cushion elements can be pivoted apart to an open position, to reveal said second seating area, said cushion elements forming arm rests when pivoted apart, and can subsequently be pivoted back to re-form said first seating area;

a seat back slidably mounted to said seat frame, said seat back being first positioned at a first end of said seat frame to provide back support for a person facing generally in the direction of vehicle forward travel and said seat back being alternately slidable, through the length of said frame, to provide back support for a person facing away from the direction of vehicle forward travel, and:

said seat back and frame comprising a sliding screw enabling said seat back to slide from said first position to said second position by manipulation of said sliding screw.

12. A vehicle seat, comprising:

a seat frame having a seat back, a first seating area, comprising a seat cushion, and a second seating area generally below said seat cushion;

said seat cushion comprising at least two cushion elements, said cushion elements each having a first end, said first ends being in proximity to each other in a first position and each cushion element being pivotally connected to said seat frame at a second end, such that said cushion elements can be pivoted apart to an open position, to reveal said second seating area, said cushion elements forming arm rests when pivoted apart, and can subsequently be pivoted back to re-form said first seating area;

a seat back slidably mounted to said seat frame, said seat back being first positioned at a first end of said seat frame to provide back support for a person facing generally in the direction of vehicle forward travel and said seat back being alternately slidable, through the length of said frame, to provide back support for a person facing away from the direction of vehicle forward travel, and:

said seat back and frame comprising at least one bar and at least one bar sliding mechanism such that said seat back can slide on said frame from said first position to said second position.

13. A method of adjusting a seat including the steps of:

providing a seat frame having a seat back, a first seating area, comprising a seat cushion, and a second seating area generally below said seat cushion;

providing at least two cushion elements on said seat cushion, said cushion elements each having a first end, said first ends being in proximity to each other in a first position and each cushion element being pivotally connected to said seat frame at a second end, such that said cushion elements can be pivoted apart to an open position, to reveal said second seating said cushion elements forming arm rests when pivoted apart, and can subsequently be pivoted back to re-form said first seating area;

providing a seat back slidably mounted to said seat frame, said seat back being first positionable at a first end of said seat frame to provide back support for a person facing generally in the direction of vehicle forward travel said seat back being alternately slidable, through the length of said frame, to provide back support for a person facing away from the direction of vehicle forward travel, and:

providing a sliding screw enabling said seat back to slide from said first position to said second position by manipulation of said sliding screw; and, adjusting said seat cushion and seat back such that said seat back is either in said first position or said second position and either pivoting said cushion elements open or closed such that said seat back and cushion are each positioned as desired.

\* \* \* \* \*